(12) United States Patent
Shipulski et al.

(10) Patent No.: US 8,890,021 B2
(45) Date of Patent: *Nov. 18, 2014

(54) PORTABLE AUTONOMOUS MATERIAL PROCESSING SYSTEM

(71) Applicant: Hypertherm Incorporated, Hanover, NH (US)

(72) Inventors: E. Michael Shipulski, Etna, NH (US); Nicholas A. Sanders, Norwich, VT (US)

(73) Assignee: Hypertherm, Inc., Hanover, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,704

(22) Filed: Dec. 6, 2012

(65) Prior Publication Data

US 2013/0098884 A1    Apr. 25, 2013

Related U.S. Application Data

(63) Continuation of application No. 12/045,670, filed on Mar. 10, 2008, now Pat. No. 8,350,182, which is a continuation-in-part of application No. 11/852,855, filed on Sep. 10, 2007, now Pat. No. 8,203,096, which is a continuation-in-part of application No. 11/518,858, filed on Sep. 11, 2006, now Pat. No. 7,615,719, said application No. 12/045,670 is a continuation-in-part of application No. 11/518,856, filed on Sep. 11, 2006, now Pat. No. 7,615,720.

(51) Int. Cl.
| | |
|---|---|
| *B23K 10/00* | (2006.01) |
| *B23K 10/02* | (2006.01) |
| *H05H 1/26* | (2006.01) |
| *H05H 1/34* | (2006.01) |
| *H05H 1/32* | (2006.01) |

(52) U.S. Cl.
CPC ............. *B23K 10/00* (2013.01); *B23K 10/02* (2013.01); *H05H 1/26* (2013.01); *H05H 1/34* (2013.01); *H05H 1/32* (2013.01)
USPC ................ 219/121.48; 219/121.39; 219/75; 219/121.54

(58) Field of Classification Search
CPC ........... B23K 10/00; H05H 1/23; H05H 1/32; H05H 1/34
USPC ............ 219/121.48, 121.39, 121, 44, 121.45, 219/121.54, 121.46, 121.57, 75; 313/313; 136/252
See application file for complete search history.

(56) References Cited

U.S. PATENT DOCUMENTS

| | | |
|---|---|---|
| 3,309,497 A | 3/1967 | Kensrue |
| 4,182,949 A | 1/1980 | Powers et al. |

(Continued)

FOREIGN PATENT DOCUMENTS

| | | |
|---|---|---|
| CA | 1 090 428 | 11/1980 |
| CN | 86210798 | 10/1987 |

(Continued)

OTHER PUBLICATIONS

International Search Report for International Application No. PCT/US2007/078044, Date of Mailing Dec. 3, 2007, including Written Option of the International Searching Authority (13 pages total).

(Continued)

*Primary Examiner* — Mark Paschall
(74) *Attorney, Agent, or Firm* — Proskauer Rose LLP

(57) ABSTRACT

A portable plasma arc torch system can be used for processing materials. The system includes a replaceable or rechargeable power source and replaceable or rechargeable gas source. A controller communicates with at least one of the power source or the gas source. A plasma delivery device received via the controller current from the power source and gas from the gas source to generate a plasma arc at an output of the plasma delivery device. The plasma arc can be used to process materials such as metallic workpieces. The plasma arc torch can include a wearable portable assembly which includes the replaceable or rechargeable power and gas source. A plasma delivery device receives current from the power source in the assembly and gas from the gas source in the assembly to generate a plasma arc.

19 Claims, 29 Drawing Sheets

(56) References Cited

U.S. PATENT DOCUMENTS

| | | |
|---|---|---|
| 4,370,539 A | 1/1983 | Garlanov |
| 4,525,621 A | 6/1985 | Puschner |
| 4,791,268 A | 12/1988 | Sanders et al. |
| 5,070,227 A | 12/1991 | Luo et al. |
| 5,086,205 A | 2/1992 | Thommes |
| 5,225,657 A | 7/1993 | Blankenship |
| 5,225,658 A | 7/1993 | Yamaguchi et al. |
| 5,250,786 A | 10/1993 | Kikuchi et al. |
| 5,416,297 A | 5/1995 | Luo et al. |
| 5,472,024 A | 12/1995 | Brugerolle et al. |
| 5,660,745 A | 8/1997 | Naor |
| 5,828,030 A | 10/1998 | Naor |
| 5,886,315 A | 3/1999 | Lu et al. |
| 5,900,169 A | 5/1999 | Borowy et al. |
| 5,961,855 A | 10/1999 | Hewett et al. |
| 6,051,809 A | 4/2000 | Colella |
| 6,054,670 A | 4/2000 | Naor |
| 6,111,215 A | 8/2000 | Lilly |
| 6,194,682 B1 | 2/2001 | Schneider et al. |
| 6,225,596 B1 | 5/2001 | Chandler et al. |
| 6,242,710 B1 | 6/2001 | Naor |
| 6,331,694 B1 | 12/2001 | Blankenship |
| 6,350,960 B1 | 2/2002 | Norris |
| 6,406,759 B1 | 6/2002 | Roth |
| 6,444,944 B2 | 9/2002 | Schneider et al. |
| 6,476,354 B1 | 11/2002 | Jank et al. |
| 6,479,795 B1 | 11/2002 | Albrecht et al. |
| 6,486,430 B2 | 11/2002 | Naor |
| 6,512,201 B2 | 1/2003 | Blankenship |
| 6,552,303 B1 | 4/2003 | Blankenship et al. |
| 6,703,581 B2 | 3/2004 | Jones et al. |
| 6,747,246 B2 | 6/2004 | Crandell, III |
| 6,777,649 B2 | 8/2004 | Reynolds et al. |
| 6,815,632 B2 | 11/2004 | Dallavalle |
| 6,818,860 B1 | 11/2004 | Stava et al. |
| 6,881,921 B2 | 4/2005 | Horner-Richardson |
| 6,903,301 B2 | 6/2005 | Jones et al. |
| 6,977,358 B2 | 12/2005 | Albrecht et al. |
| 6,982,398 B2 | 1/2006 | Albrecht |
| 7,183,517 B2 | 2/2007 | Albrecht et al. |
| 7,188,645 B2 | 3/2007 | Bender et al. |
| 7,355,141 B2 | 4/2008 | Albrecht et al. |
| 7,423,238 B2 | 9/2008 | Stanzel et al. |
| 8,373,084 B2 | 2/2013 | Salsich |
| 2001/0037996 A1 | 11/2001 | Naor |
| 2001/0042736 A1 | 11/2001 | Schneider et al. |
| 2002/0023908 A1 | 2/2002 | Blankenship |
| 2002/0117483 A1 | 8/2002 | Jones et al. |
| 2002/0117484 A1 | 8/2002 | Jones et al. |
| 2002/0187066 A1 | 12/2002 | Yu et al. |
| 2004/0069752 A1 | 4/2004 | Ulrich et al. |
| 2004/0149702 A1 | 8/2004 | Dallavalle |
| 2004/0232118 A1 | 11/2004 | Horner-Richardson et al. |
| 2005/0000946 A1 | 1/2005 | Albrecht et al. |
| 2005/0073282 A1 | 4/2005 | Carrier et al. |
| 2005/0077878 A1 | 4/2005 | Carrier et al. |
| 2005/0109748 A1 | 5/2005 | Albrecht et al. |
| 2005/0111995 A1 | 5/2005 | Everson |
| 2005/0252889 A1 | 11/2005 | Stanzel et al. |
| 2005/0252890 A1 | 11/2005 | Stanzel et al. |
| 2005/0252899 A1 | 11/2005 | Stanzel et al. |
| 2005/0263514 A1 | 12/2005 | Albrecht |
| 2006/0124638 A1 | 6/2006 | Jensen |
| 2006/0138113 A1 | 6/2006 | Ott |
| 2007/0181547 A1 | 8/2007 | Vogel et al. |
| 2007/0187376 A1 | 8/2007 | Albrecht et al. |
| 2007/0221628 A1 | 9/2007 | Stanzel et al. |
| 2007/0257084 A1 | 11/2007 | Carrier et al. |
| 2008/0029153 A1 | 2/2008 | Margalit |
| 2009/0057285 A1 | 3/2009 | Bashore et al. |

FOREIGN PATENT DOCUMENTS

| | | |
|---|---|---|
| CN | 2682717 | 3/2005 |
| DK | 83 08 999.3 | 11/1983 |
| EP | 1 500 456 | 1/2005 |
| EP | 1 535 691 | 6/2005 |
| EP | 1 596 123 A1 | 11/2005 |
| EP | 1 679 666 A2 | 12/2005 |
| EP | 1 629 926 | 3/2006 |
| EP | 1 852 206 | 11/2007 |
| GB | 1 453 100 | 10/1976 |
| GB | 2 316 244 | 2/1998 |
| JP | 56077068 | 6/1981 |
| JP | 01245972 | 10/1989 |
| JP | 401245972 | 10/1989 |
| JP | 401245972 A | 10/1989 |
| WO | 00/76709 A1 | 12/2000 |
| WO | 2005/026650 | 3/2005 |
| WO | 2009/085370 | 7/2009 |

OTHER PUBLICATIONS

International Search Report for International Application No. PCT/US2008/075788, Date of Mailing Oct. 9, 2009, including Written Opinion of the International Searching Authority (17 pages total).

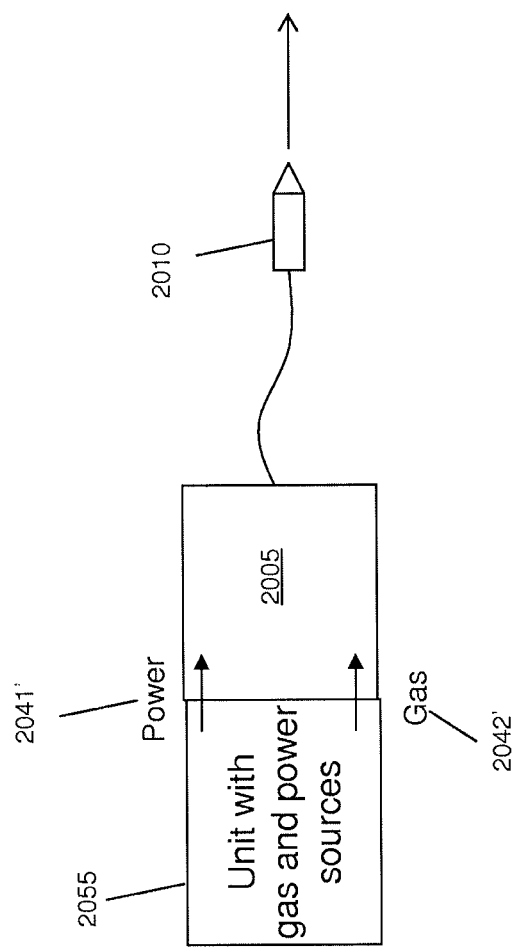

PORTABLE AUTONOMOUS MATERIAL PROCESSING SYSTEM

RELATED APPLICATIONS

This application is a continuation of U.S. Ser. No. 12/045,670 filed on Mar. 10, 2008, which is a continuation-in-part of U.S. Ser. No. 11/852,855, now U.S. Pat. No. 8,203,096, filed on Sep. 10, 2007, which is a continuation-in-part of U.S. Ser. No. 11/518,858, now U.S. Pat. No. 7,615,719, filed on Sep. 11, 2006. This application is also a continuation-in-part of U.S. Ser. No. 11/518,856, now U.S. Pat. No. 7,615,720, filed on Sep. 11, 2006. This application also claims benefit of and priority to International Application No. PCT/US07/78044 filed on Sep. 10, 2007, which claims priority to and benefit of U.S. Ser. No. 11/518,858, now U.S. Pat. No. 7,615,719, filed on Sep. 11, 2006. The contents of all of these applications are incorporated herein by reference in their entirety.

TECHNICAL FIELD

The invention relates generally to portable tools for processing materials. More specifically, the invention relates to portable plasma arc torch systems for processing materials, such as those that are hand-held or wearable.

BACKGROUND

Plasma arc torch systems can be applied to a wide variety of material processing applications such as cutting the thin plates of metal used for heating, ventilation and air conditioning systems or thick plates. Traditionally, plasma arc cutting systems are not portable because they require a large, cumbersome gas source (or a continuous, fixed gas source) and large amounts of power drawn from the electrical power grid via a corded attachment.

A plasma arc torch generally includes a torch body, an electrode mounted within the body, a nozzle with a central exit orifice, electrical connections, passages for cooling and arc control fluids, a swirl ring to control the fluid flow patterns, and a power supply. The torch produces a plasma arc, which is a constricted ionized jet of a plasma gas with high temperature and high momentum. Gases used in the torch can be non-reactive or reactive (e.g. argon, nitrogen, oxygen or air).

In operation, a pilot arc is first generated between the electrode (cathode) and the nozzle (anode). The pilot arc ionizes gas passing through the nozzle exit orifice. After the ionized gas reduces the electrical resistance between the electrode and the workpiece sufficiently, the arc transfers from the nozzle to the workpiece. The torch may be operated in this transferred plasma arc mode, which is characterized by the conductive flow of ionized gas from the electrode to the workpiece, for the cutting of the workpiece.

Despite cordless power tools being pervasive in the commercial market, plasma arc torch systems have yet to be efficiently adapted for easy, portable usage. One design difficulty is caused by the relatively large gas consumption of a plasma arc torch. Another design difficulty is caused by the high power requirements of the plasma arc torch system, e.g., about 1.32 kW output for a low power system such as the Powermax™ 190C manufactured by Hypertherm, Inc. of Hanover, N.H.; 8.4 kW output for a medium power torch system such as the Powermax 1000 manufactured by Hypertherm and up to 16,000 kW output for a high power torch system such as the Powermax 1650 manufactured by Hypertherm. The high power requirements of a plasma arc torch system have resulted in designs where the plasma arc torch system is used by plugging into a wall, utilizing a continuous supply of AC power. There exists a difficult balance between the performance of the torch, the lifetime of the gas and power sources, and actual physical size of the plasma arc torch system.

It is therefore desirable to provide a portable plasma arc cutting system that has power considerations for operating the torch effectively at lower gas consumption and lower power levels, while providing portability and performance for the applications described above. Additionally, it is desirable for the gas and power sources of the plasma arc torch system to operate for a commercially useful duration with ease of recharge or replacement for repeatable use.

SUMMARY OF THE INVENTION

Aspects of the invention represent an advance in the plasma processing industry in that embodiments of the invention are portable systems that can process materials without the need for a large, cumbersome gas source (or a continuous, fixed gas source) and without being continuously connected to the electrical power grid. As such, embodiments of the invention can be used at construction sites, in agricultural areas, by emergency safety personnel (e.g., firefighters, police, etc.), by workers in remote locations where connectivity to the electrical power grid is not possible, or by consumers in their own backyards.

In one aspect, the invention features a plasma arc torch apparatus for processing materials. The plasma arc torch apparatus includes a wearable portable assembly that includes at least one of a replaceable or rechargeable power source or a replaceable or rechargeable gas source. The apparatus also includes a plasma delivery device receiving current from the power source and gas from the gas source to generate a plasma arc. In some embodiments, the wearable portable assembly is a backpack. In some embodiments, the portable assembly includes a layer that is thermal resistant, electrically non-conductive, and/or impact resistant.

In some embodiments, the plasma arc torch apparatus includes a remote control device adapted to communicate with at least one of the power source or the gas source. The apparatus can include a control device on the plasma delivery device adapted to communicate with at least one of the power source or the gas source. In some embodiments, the plasma arc torch apparatus includes at least one of an indicator of power remaining in the power source or an indicator of a remaining gas in the gas source.

In some embodiments, the gas source includes a compressor that compresses gas to be delivered to the plasma delivery device. The power source can power a compressor to recharge the gas source. In some embodiments, the plasma delivery device is attachable to the wearable portable assembly. The portable assembly can be attachable to a charging device configured to charge at least one of the power source or the gas source. In some embodiments, the portable assembly includes a filament wound composite tank. The plasma arc torch assembly can include a current regulator for regulating the current received by the plasma delivery device from the power source. In some embodiments, the power source is a polymer lithium ion battery.

In another aspect, the invention features a system including a wearable portable assembly. In some embodiments, the wearable portable assembly is a backpack. The wearable portable assembly includes a plasma arc torch system having at least one of a replaceable or rechargeable power source or a replaceable or rechargeable gas source. The system includes a docking station attachable to the assembly. The docking station includes at least one of a power supply for recharging the power source or a gas supply for recharging the gas source.

In another aspect, the invention features a method for processing materials. The method includes providing a plasma delivery device in communication with a wearable portable assembly. The assembly having at least one of a replaceable or rechargeable power source or a replaceable or rechargeable gas source. The method includes generating a plasma arc emanating from the plasma delivery device while the assembly is worn by a user, by providing thereto current from the power source and gas from the gas source.

In yet another aspect, the invention features a device for charging a portable plasma arc torch apparatus. The device includes a docking port configured to receive the portable plasma arc torch apparatus, the portable plasma arc torch apparatus including a rechargeable power source and rechargeable gas source. The device includes a first connector configured to electrically couple to the power source when the apparatus is docked to the docking port, the first connector providing power to recharge the power source. The device also includes a second connector configured to fluidly couple to the gas source when the apparatus is docked to the docking port, the second connector providing gas to recharge the gas source. In some embodiments, the portable plasma arc torch apparatus is wearable. In some embodiments, at least one of the power source and gas source is removable.

In another aspect, the invention features a device for charging a portable welding apparatus. The device includes a docking port configured to receive the portable welding apparatus, the portable welding apparatus including a rechargeable power source and rechargeable gas source. The device includes a first connector configured to electrically couple to the power source when the apparatus is docked to the docking port, the first connector providing power to recharge the power source. The device also includes a second connector configured to fluidly couple to the gas source when the apparatus is docked to the docking port, the second connector providing gas to recharge the gas source.

In another aspect, the invention features a welding apparatus. The apparatus includes, e.g., a wearable or carry-able portable assembly, including at least one of a replaceable or rechargeable power source or a replaceable or rechargeable gas source. The apparatus also includes a welding delivery device receiving current from the power source and gas from the gas source to generate a welding arc.

In another aspect, the invention features a portable plasma arc torch system that can be used for processing materials (e.g., cutting, piercing, marking or scoring metallic workpieces). In some embodiments, the system includes a replaceable or rechargeable power source, such as one or more batteries. The system also includes a replaceable or rechargeable gas source disposed relative to the power source. The gas source can be disposable or refillable (e.g., one or more gas containers). In some embodiments, the gas source can be a continuous source of gas (e.g., a compressor). In some embodiments, the power source and the gas source are stored in a portable enclosure.

In some embodiments, a controller communicates with at least one of the power source or the gas source. The controller can include electrical controls and fluid controls. A plasma delivery device (e.g., a plasma arc torch) uses current and voltage from the power source and gas from the gas source to generate a plasma arc at an output of the plasma delivery device. The plasma arc can be used to process materials such as metallic workpieces.

The controller is electrically connected to the power source, the gas source and a plasma delivery device by a communication path (e.g., a bus, a wireless connection, etc.). In some embodiments, a transmission medium provides electrical and a fluid communication paths the power source and the plasma delivery device and the gas source and the plasma delivery device, respectively. The power source is in electrical communication with the plasma delivery device via an electrical communication path (e.g., an electrical lead set, a wireless connection, etc.). The gas source is in fluid communication with the plasma delivery device via a fluid conduit. In some embodiments, the electrical lead set, the fluid conduit and the plasma delivery device can be storable in the portable enclosure. In addition, the enclosure is transportable and can be a hand-held housing and/or a briefcase-sized housing.

In another aspect, the invention also features a portable plasma arc torch system that can be used for cutting a workpiece. The system can include a portable enclosure with a replaceable or rechargeable power means and a replaceable or rechargeable gas means disposed within the enclosure. A control means and a transmission means are in communication the power means and the gas means. A plasma delivery means receives current and voltage from the power means and gas from the gas means to generate a plasma arc that can be used for cutting a workpiece.

The control means can be in electrical communication with the power means, the gas means and the plasma delivery means. The transmission means provides electrical and fluid communication paths from the power means and gas means to the plasma delivery means. The power means is in electrical communication with the plasma delivery means via an electrical communication path (e.g., an electrical lead set, a wireless connection, etc.). The gas means is in fluid communication with the plasma delivery means via a fluid conduit. In some embodiments, the electrical lead set, the fluid conduit and the plasma delivery means can be storable in the portable enclosure. The enclosure is transportable and can be a hand-held housing and/or a briefcase-sized housing.

Contact starting is one known technique for generating the pilot arc in a plasma torch. Contact starting is advantageous because it does not require high frequency equipment and does not normally generate electromagnetic interference. Typical contact starting systems include pilot arc circuits having a means for supplying pilot arc current, a pilot arc resistor, a current sensor, and a pilot arc relay, or a combination thereof, for transferring current from a pilot arc mode to a transferred arc mode. These pilot arc circuits increase the system size and cost of production.

A contact start plasma arc torch is provided that includes a passive pilot arc circuit that decreases the size and cost of the torch. The plasma arc torch includes a torch body, an electrode having a longitudinally disposed axis and mounted in the body, a nozzle having a longitudinally disposed axis, the nozzle axis being disposed substantially collinearly with the electrode axis, a power supply coupled to the electrode, the nozzle and a workpiece, the power supply providing a current for operating the torch in a pilot arc mode and a transferred arc mode, and a pilot arc circuit coupled between the power supply and the nozzle, the pilot arc circuit controlling the operation of the torch in the pilot arc mode. Either the electrode or the nozzle can be translatable.

The pilot arc circuit can include a pilot capacitor and a pilot resistor. The pilot capacitor and pilot resistor can be coupled in series. The pilot capacitor can have a value ranging between 10 microfarads and 100,000 microfarads. The pilot resistor can have a value ranging between 0.1 ohms and 100 ohms. In some embodiments, the pilot arc circuit can include a pilot capacitor and a pilot variable resistor or a pilot capacitor and an inductor. The pilot arc circuit can further include a discharge circuit coupled in parallel to the pilot capacitor for the discharging the pilot capacitor. The discharge circuit can include a discharge resistor and a discharge relay.

A method for operating of a contact start plasma arc torch includes providing a contact start plasma arc torch having an electrode and a nozzle disposed in a torch body, supplying electrical power to the torch for operation in a pilot arc mode and a transferred arc mode, and disconnecting power to the pilot arc mode of the torch through a passive pilot arc circuit. The pilot arc circuit disconnects when the pilot arc capacitor is charged or substantially charged. The power can be disconnected at a predetermined time, wherein the predetermined time can be determined by an RC time constant of the pilot arc circuit. The magnitude of a pilot arc current can also be determined by the RC time constant of the pilot arc circuit. The RC component values can be fixed or variable.

The method can further include removing electrical power to the torch and discharging the pilot arc capacitor through a discharge circuit. The discharge circuit can include a discharge resistor and a discharge relay.

There is also provided a contact start plasma arc torch including means for supplying electrical power to a contact start plasma arc torch for operation in a pilot arc mode and a transferred arc mode and means for disconnecting power to the pilot arc mode of the torch though a passive pilot arc circuit.

There is also provided a power source for a contact start plasma arc system including a power supply for supplying electrical power to a torch for operation in a pilot arc mode and a transferred arc mode and a passive pilot arc circuit for disconnecting power to the pilot arc mode.

Advantages of the contact start plasma arc torch include: a passive pilot arc starting circuit; automatically disconnecting the pilot arc circuit at a predetermined time; easily setting the magnitude of the pilot arc current; eliminating the need for current sensing and logic control of the pilot arc circuit; seamlessly transferring current from the pilot art circuit to the workpiece; and minimization of the components resulting in decreased production costs of the plasma torch.

In one aspect, the invention features a self-contained portable plasma arc torch system. The portable plasma arc torch system can include a housing and a plasma arc torch assembly. The plasma arc torch assembly can include a plasma arc torch control unit and a plasma arc torch, the plasma arc torch control unit disposed in the housing and connected to the torch. The portable plasma arc torch system can include a battery for providing DC power to the plasma arc torch assembly, the battery disposed relative to the housing and providing sufficient voltage to a torch electrode to enable torch operation without requiring power conditioning circuitry.

In some embodiments, the plasma arc torch control unit includes an on-off electrical switch and gas controls for providing a gas to the plasma arc torch. The portable plasma arc torch system can include a portable gas source for providing a gas to the plasma arc torch assembly, the gas source supported by the housing. In some embodiments, the portable gas source is a high-pressure gas container.

A voltage supplied by the battery to the plasma arc torch assembly can be about at least about 45 volts of DC power. In some embodiments, the battery provides sufficient voltage to a torch electrode without requiring power conditioning circuitry that includes voltage step-up circuitry or high frequency switching.

In some embodiments, the self-contained portable plasma arc torch system is sufficiently portable to be entirely held or worn by a user during operation of the plasma arc torch. The battery and a gas source can be part of an attachment module, the attachment module being detachable from the system. In some embodiments, the attachment module is connected to the plasma arc torch assembly with a power connection for the battery or a gas connection for the gas source. The attachment module can be connected to the plasma arc torch assembly with at least one of an electrical connection for transferring power with the battery or a hose connection for transferring gas.

The invention, in another aspect, features a chargeable power and gas unit for a portable plasma arc torch system that can include a portable housing, a source of cutting gas disposed relative to the portable housing, and a battery providing sufficient DC power for torch operation, the battery disposed relative to the portable housing. The chargeable power and gas unit can also include a first connector assembly disposed relative to the portable housing, the first connector assembly comprising an input for receiving gas to charge the source of cutting gas and a second connector assembly disposed relative to the portable housing, the second connector assembly comprising an input for receiving a charge to charge the battery.

In some embodiments, the battery provides sufficient DC power for torch operation without requiring power conditioning circuitry. The first connector assembly can include an output adapted to mate with a gas connection on a plasma arc torch system. In some embodiments, the first connector assembly includes a hose to connect the chargeable power and gas unit with a plasma arc torch system. The second connector assembly can include an output adapted to mate with a power connection on a plasma arc torch system. In some embodiments, the second connector assembly includes a wire to connect the chargeable power and gas unit with a plasma arc torch system.

The invention, in another aspect, features a charging unit for replenishing a chargeable power and gas unit of a portable plasma arc torch system. The charging unit can include a connection to a plasma gas cutting source and a connection to an electrical power source for providing charging power. The charging unit can include a first connector assembly for providing a gas charge to a gas source of the chargeable power and gas unit and a second connector assembly for providing electrical power to charge the battery of the chargeable power and gas unit.

In some embodiments, the second connector assembly provides DC electrical power to the chargeable power and gas unit. The first and second connector assemblies can mate with corresponding connectors on the chargeable power and gas unit when the chargeable power and gas unit is mounted in the charging unit.

The invention, in another aspect, features a plasma arc torch system. The plasma arc torch system can include a power lead for receiving remote power from a non-portable power source, and a gas lead for receiving torch gas from a non-portable gas source. The plasma arc torch system can also include a first connector assembly for receiving a plasma gas from a plasma gas cutting source of an attachment module and a second connector assembly for receiving DC electrical power from a DC battery of the attachment module, such that the torch can be operated when the power lead and the gas lead are not connected, using only gas from the first connector and power from the second connector.

In some embodiments, the battery of the attachment module provides sufficient voltage for torch operation without requiring power conditioning circuitry. Providing sufficient voltage for torch operation without requiring power conditioning circuitry can include providing voltage without stepping up the voltage or performing high frequency switching of the voltage. In some embodiments, the battery of the attachment module provides at least 80 Volts of DC power to the plasma arc torch.

The invention, in another aspect, features a method for minimizing gas consumption of a portable plasma arc torch. The method can include commencing a flow of gas to the portable plasma arc torch from a portable, finite supply of gas, initiating a plasma arc, terminating the plasma arc and sacrificing electrode life to minimize gas consumption by eliminating or substantially reducing a flow of the gas about an electrode of the plasma arc torch during preflow or postflow conditions, to less than approximately 10 seconds before commencement or after termination of the plasma arc, thereby minimizing gas consumption.

The invention, in one aspect, features a self-contained portable plasma arc torch system. The system can include a housing, a plasma arc torch assembly comprising a plasma arc torch control unit and a plasma arc torch, the plasma arc torch control unit disposed in the housing and connected to the torch and a battery for providing DC power to the plasma arc torch assembly, the battery disposed relative to the housing and providing at least 80 Volts of DC power to a torch electrode.

In invention, in yet another aspect, features a portable plasma arc torch apparatus for processing materials. The apparatus can include a plasma delivery device, a replaceable or rechargeable battery disposed relative to the plasma delivery device, the battery providing at least about 80 volts to the plasma delivery device. The apparatus also can include a replaceable or rechargeable gas source disposed relative to the plasma delivery device and providing a gas to the plasma delivery device for generation of a plasma arc.

The invention, in yet another aspect, features a self-contained portable plasma arc torch system. The system can include a housing, a plasma arc torch assembly, a battery for providing DC power to the plasma arc torch assembly and a gas source for providing a gas to the plasma arc torch assembly. The system can also include an indicator representing at least one of a power level of the battery, a gas remaining in the gas source, or an amount of cutting capacity remaining in the system.

In some embodiments, the system can include an indicator displaying an indicia when a gas level of a gas source has reached a threshold level or when an energy level of the battery source has reached a threshold level.

The invention, in another aspect, features a lightweight, portable plasma arc torch system. The system can include a plasma arc torch assembly comprising a plasma arc torch control unit and a plasma arc torch. The system can also include a battery for providing DC power to the plasma arc torch assembly and a gas source for providing gas to the plasma arc torch assembly wherein a power to weight ratio for the lightweight portable plasma arc torch system is at least about 80 watts per pound.

The invention, in yet another aspect, features a portable plasma arc torch apparatus for generating a plasma arc for the high temperature thermal processing of materials. The apparatus can include a plasma delivery device including a plasma torch, a torch having an electrode and a nozzle defining a a plasma chamber therebetween. The apparatus can also include a replaceable or rechargeable battery coupled to the plasma delivery device, the battery for providing cutting power to the plasma delivery device. The apparatus can also include a replaceable or rechargeable gas source having a finite supply of gas and coupled to the plasma delivery device to provide a gas to the plasma delivery device; wherein during a discharge of the gas source, substantially all of the gas is discharged through the plasma chamber.

In some embodiments, a flow of the gas is initiated at substantially the same time that the plasma arc is initiated. The flow of gas is initiated at a time not more than about 10 seconds before initiation of the plasma arc. In some embodiments, a flow of the gas is substantially reduced or terminated at substantially the same time that the plasma arc is terminated. The flow of gas can be substantially reduced or terminated at a time not more than about 10 seconds after termination of the plasma arc.

BRIEF DESCRIPTION OF THE DRAWINGS

The foregoing and the invention will be more fully understood from the following description of various embodiments, when read together with the accompanying figures. The drawings are not necessarily to scale, emphasis instead being placed upon illustrating the principles of the invention.

FIG. 16B is a schematic of an attachment module and a plasma arc torch assembly, according to another illustrative embodiment

DETAILED DESCRIPTION

Plasma arc torches have a wide variety of applications such as the cutting of thick plates of metal and the cutting of comparatively thin sheets of galvanized metal commonly used in heating, ventilating and air conditioning (HVAC) systems. The basic components of a plasma arc torch include a torch body, an electrode (cathode) mounted within the body, a nozzle (anode) with a central exit orifice, a gas source to provide a flow of an ionizable gas, electrical connections, passages for cooling and arc control fluids, and a power source that produces a pilot arc in the gas, typically between the electrode and the nozzle, and then a plasma arc, a conductive flow of the ionized gas from the electrode to a workpiece. The gas can be non-oxidizing, e.g. nitrogen, argon/hydrogen, or argon, or oxidizing, e.g. oxygen or air.

Various plasma arc torches of this general type are described in U.S. Pat. Nos. 4,791,268; 4,902,871; 5,170,033; 5,317,126; and 5,994,663, all commonly assigned with the present application. Plasma arc torches and related products are sold in a variety of models by a number of manufacturers including Hypertherm. The Powermax 1000 brand torch sold by Hypertherm is typical of the medium power torches, using H35 (35% H 65% Ar) and N2 or H35 and air as the working gas and useful for both plate fabrication and HVAC applications. The Powermax 1650 brand torch sold by Hypertherm is typical of the high power torches often using H35 and N2 as the working gas. High power torches can be water-cooled and used to pierce and cut thick metal sheets, e.g. 1 inch thick mild steel plate.

Figure 1:
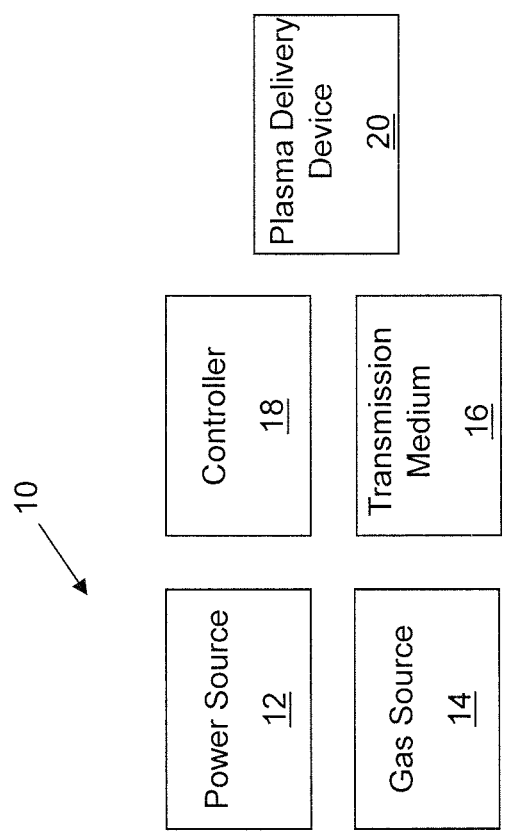
FIG. 1 is a block diagram showing the representative functional components of an autonomous plasma arc torch system.

Referring now to FIG. 1, a block diagram showing representative functional components of a plasma arc torch system 10 is shown. This plasma arc torch system is "autonomous" in that it is a portable system capable of processing metallic materials without large, bulky gas canisters (and, in some embodiments, without a continuous, fixed gas source) and without connection to the electrical power grid by a power cord. In various embodiments, the system is mobile and transportable. In some embodiments, the system can be disposed in a "briefcase-sized" (and/or hand-held) housing that can be hand-carried or otherwise transported to local and remote locations for use. In other embodiments, the system may be more compact, including a plasma delivery device that can be charged and removed from a power source disposed in a briefcase-sized housing for remote use (e.g., a system comparable in size to that of a cordless drill). It is expected that embodiments of the invention can be used at construction sites, in agricultural areas, by emergency safety personnel (e.g., firefighters, police, etc.), by workers in remote locations where connectivity to the electrical power grid is not possible or desirable, or by consumers in their own backyards.

In one exemplary embodiment, the system 10 includes five primary components: a power source 12, a gas source 14, a transmission medium 16, a controller 18 and a plasma delivery device 20. The power source 12 can be rechargeable and/or replaceable (e.g., one or more batteries). The gas source 14 can be one or more replaceable and/or rechargeable gas containers or a portable compressor. The transmission medium 16, which can include an electrical transmission capability and/or a fluid transmission capability, is connected to the plasma delivery device 20. The electrical transmission capability can include an electrical lead set, such as any of those manufactured by Hypertherm Inc., a bus or a wireless connection. The fluid transmission capability can include a fluid conduit. The controller 18 can include electrical controls and/or a fluid controls (e.g., a trigger, relay, solenoid valve, pressure regulator, etc.). The plasma delivery device 18 can include a plasma arc torch, such as those manufactured by Hypertherm, Inc. The torch can be started by manipulating a trigger (not shown) disposed on the device 18. In addition, the system 10 can include various user controls (not shown), such as a current limiting switch, a toggle switch, a key pad, a touch pad, dials, knobs or other means to enable a user to manipulate or otherwise control parameters of the torch. In some embodiments, features used in the autonomous plasma arc torch system 100 described herein can be applied to a portable welding apparatus (not shown).

Figure 2:
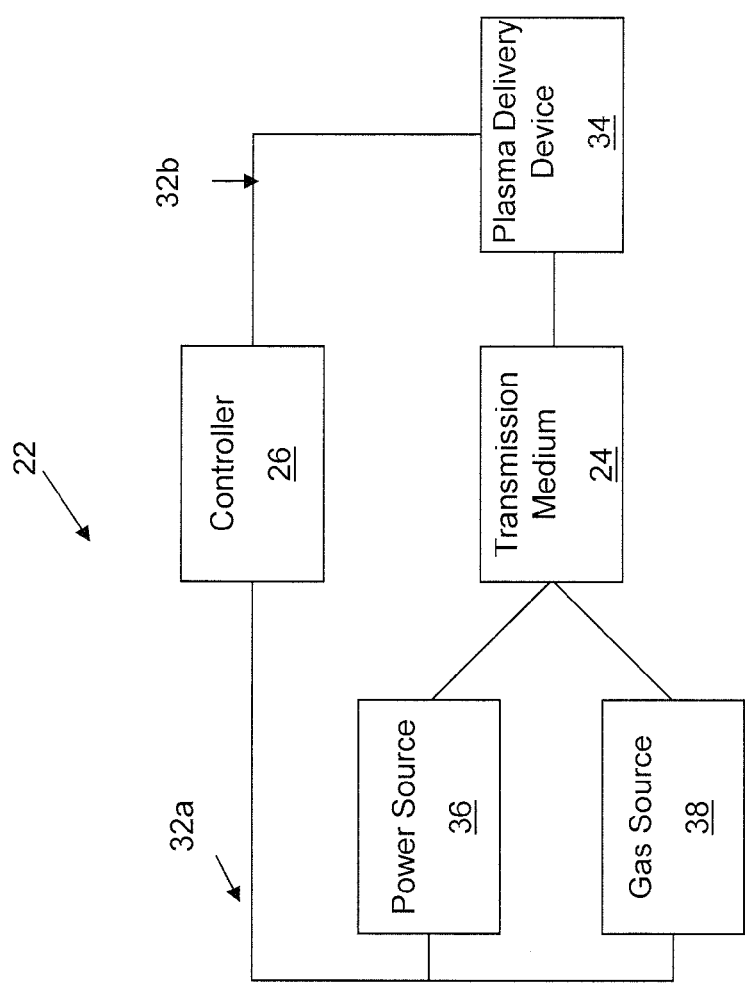
FIG. 2 is a block diagram showing an implementation of the representative components of an autonomous plasma arc torch system using a single control means and a single transmission medium.

FIG. 2 is a block diagram showing one exemplary implementation of the representative components of an autonomous plasma arc torch system 22 using a single transmission medium 24 and a single controller 26. The controller 26 communicates with the power source 28 and the gas source 30 via a common electrical connection 32 (e.g., a bus). In addition, the controller uses another electrical connection 32b to communicate with the plasma delivery device 34. The power source 36 provides current and the gas source 38 provides gas to the plasma delivery device 34 via the transmission medium 24. In one implementation, the transmission medium 24 comprises an electrical lead set for providing current from the power source 36 to the plasma delivery device 34, and a fluid conduit for providing gas from the gas source 38 to the plasma delivery device 34. The plasma delivery device 34 can be a plasma arc torch. The system 22 can also include user controls, as described previously, to control parameters of the torch. The representative components of the autonomous plasma arc torch system 22 can be applied to a portable welding apparatus.

Figure 3:
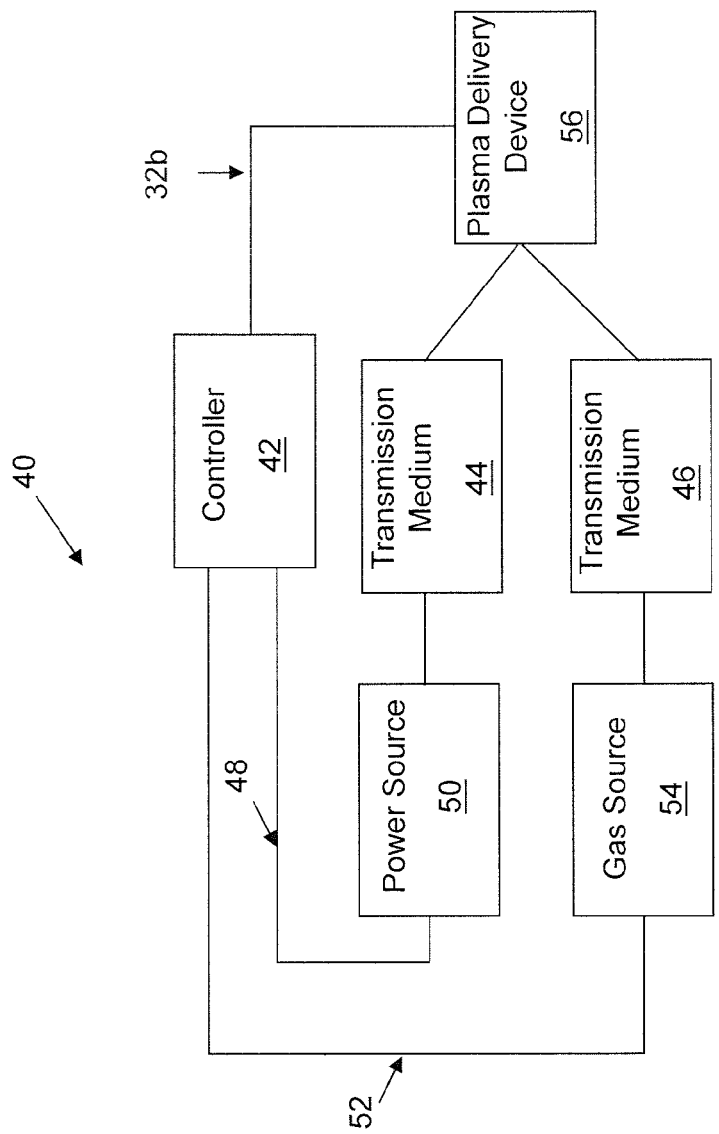
FIG. 3 is a block diagram showing a variation of the implementation of FIG. 2 using a single controller and a pair of transmission medium.

FIG. 3 is a block diagram showing another implementation of a portable plasma arc torch system 40. The system 40 uses a single controller 42 and a pair of transmission media 44, 46. The controller 42 communicates via a first electrical connection 48 with the power source 50 and communicates via another electrical connection 52 with the gas source 54. The controller 42 also communicates with the plasma delivery device 56. The power source 50 provides current to the plasma delivery device 56 via a transmission medium 44, and the gas source 54 provides gas to the plasma delivery device 56 via the transmission medium 46. The plasma delivery device 56 can be a plasma arc torch. The system 40 can also include user controls (not shown) to control parameters of the torch. In some embodiments, the implementation is used in a portable welding apparatus.

Figure 4:
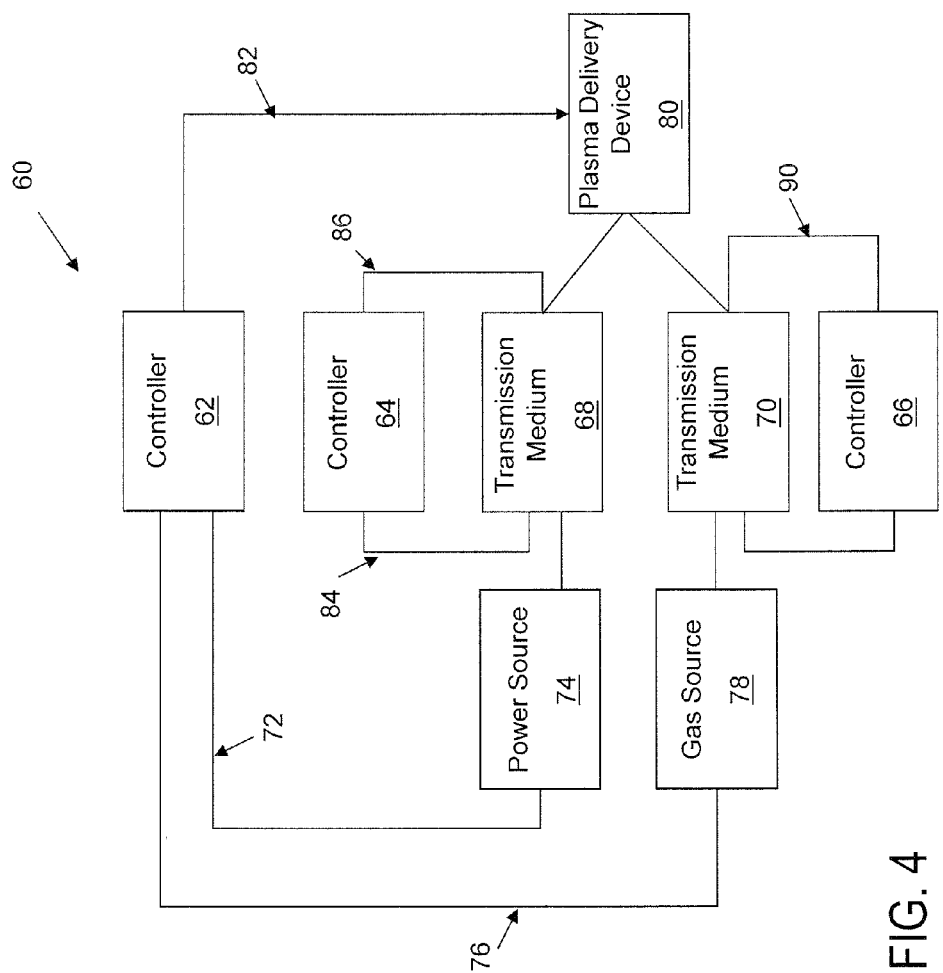
FIG. 4 is a block diagram showing a variation of the implementation of FIG. 2 using three controllers and two transmission media.

FIG. 4, a block diagram showing a variation of the implementation of a portable plasma arc torch system 60 using three controllers 62, 64, 66 and two transmission media 68 70. The controller 62 communicates via an electrical connection 72 with the power source 74 and via a separate electrical connection 76 with the gas source 78. The controller 62 communicates with the plasma delivery device 80 via another electrical connection 82. The controller 64 communicates with the transmission medium 68 via two electrical connections 84, 86. Similarly, the controller 66 communicates with the transmission medium 70 via two electrical connections 88, 90. The power means 74 provides current to the plasma delivery device 80 by way of transmission medium 68, and the gas source 78 provides gas to the plasma delivery device 80 by way of a transmission medium 70. The plasma delivery device 80, which can be a plasma arc torch, is positioned relative to a workpiece for cutting operations. The system 60 can also include user controls, as described previously. In some embodiments, the implementation is used in a portable welding apparatus.

FIGS. 5a, 5b, 5c and 5d are exemplary embodiments of various physical partitioning configurations of the autonomous plasma cutting system. In some embodiments, the various physical partitioning configurations are used in a portable welding apparatus.

Figure 5A:
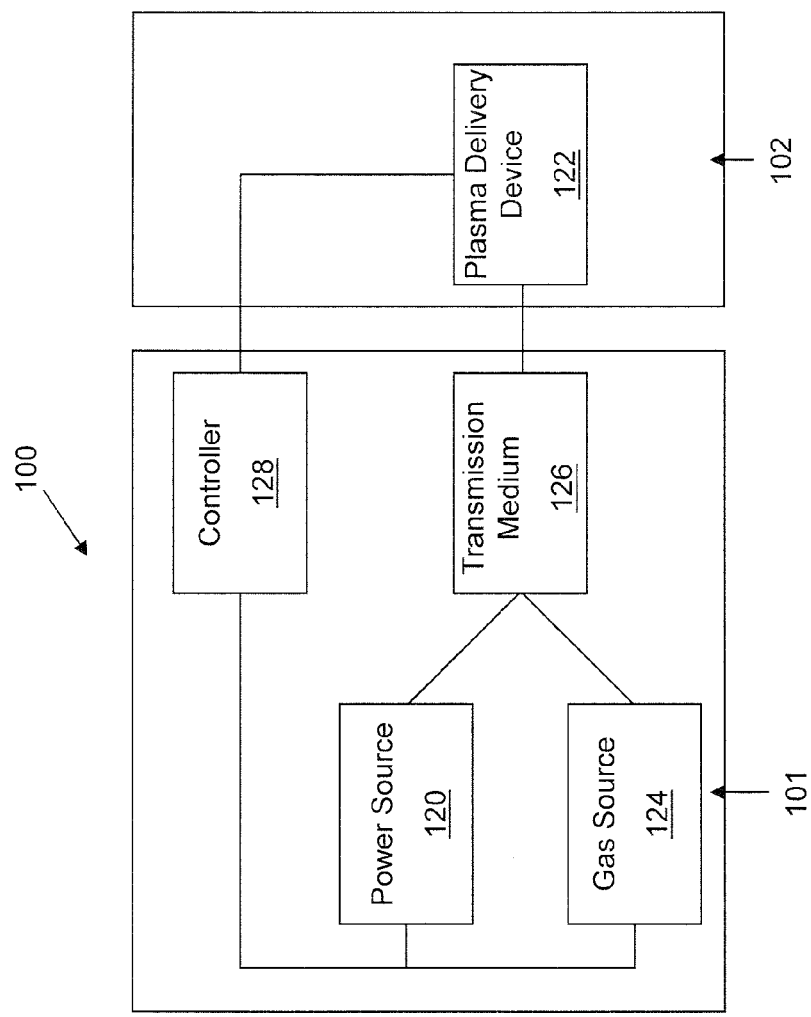
FIG. 5a is an example of a physical partitioning of the functional implementation with the plasma delivery device in one partition and connected to the power means, controller and transmission medium housed in another partition.

FIG. 5a depicts a plasma torch system 100 partitioned into an enclosure section 101 and a torch section 102. In one embodiment, the two sections are stored in a single, briefcase-style housing (not shown). The housing can be hand-held to enable a user to carry the system 100 to a remote location. The enclosure section 101 includes a power source 120, gas source 124, transmission medium 126, and controller 128. The plasma delivery device 122 is located in the torch section 102.

Figure 5B:
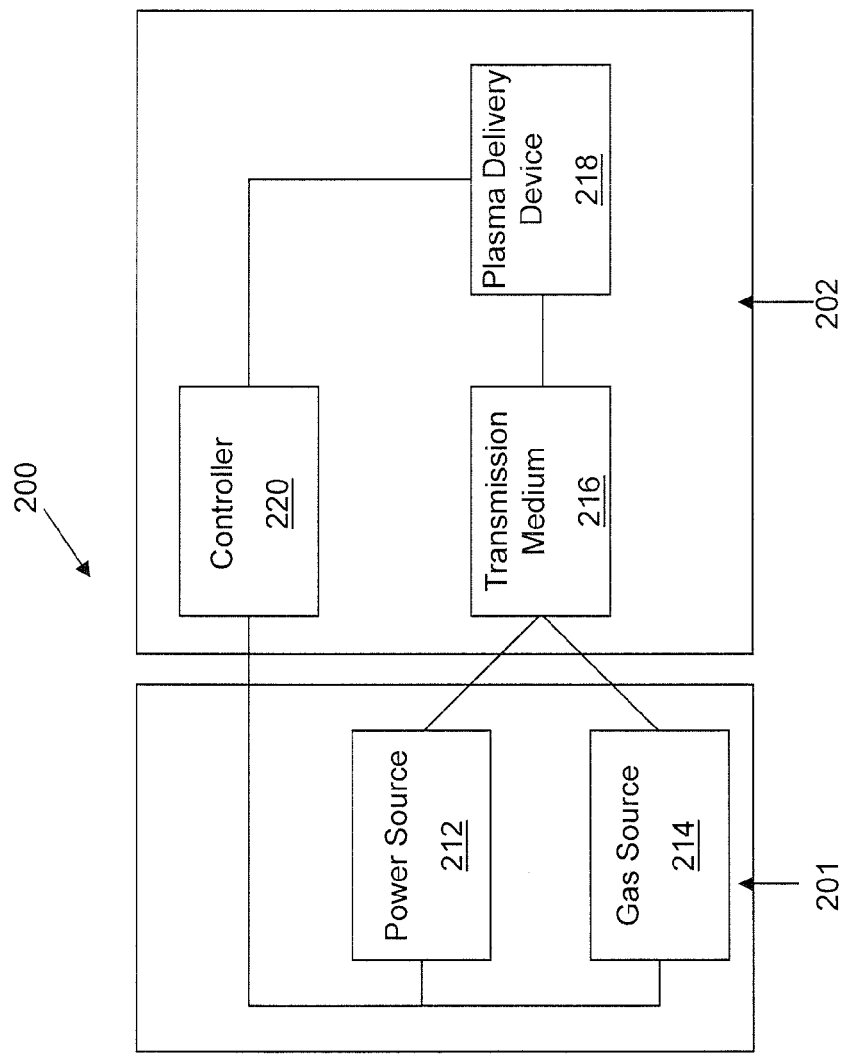
FIG. 5b is a variation of FIG. 5a with the plasma delivery, controller and transmission medium housed in one partition and connected to the power means and gas means housed in another partition.

FIG. 5b depicts a plasma torch system 200 partitioned into a torch attachment section 201 and a torch section 202. In one embodiment, the two sections are stored in a single, briefcase-style housing. The attachment section 201 (e.g., attachment module, canister, or chargeable/rechargeable unit) can be thought of as analogous to a removable battery pack, except that it includes both a power source 212 and gas source 214. The torch section 202 includes a transmission medium 216, controller 220 and a plasma delivery device 218.

Figure 5C:
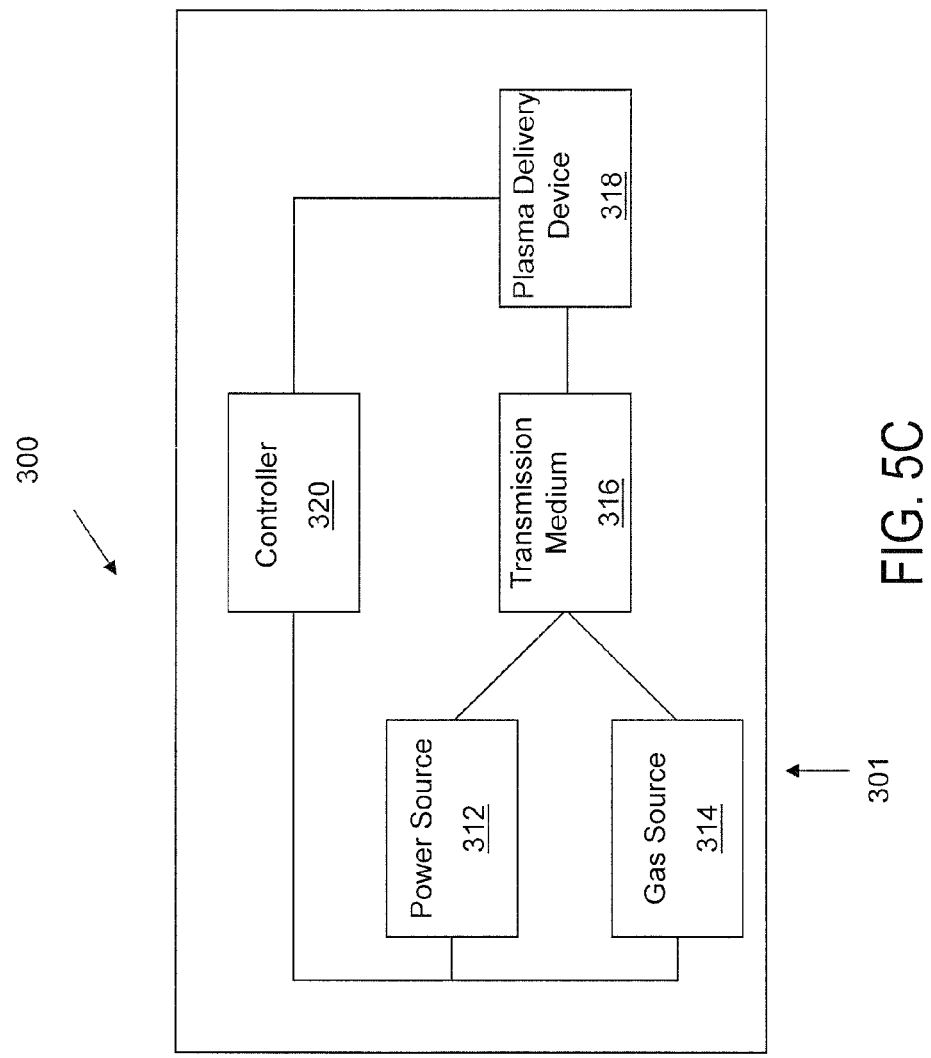
FIG. 5c is a variation of FIG. 5a with all components of the system housed in a single partition.

FIG. 5c depicts a plasma torch system 300 having the primary components in a single enclosure 301 (or housing). The enclosure section 301 includes a power source 312, gas source 314, transmission medium 316, controller 320, and plasma delivery device 318.

Figure 5D:
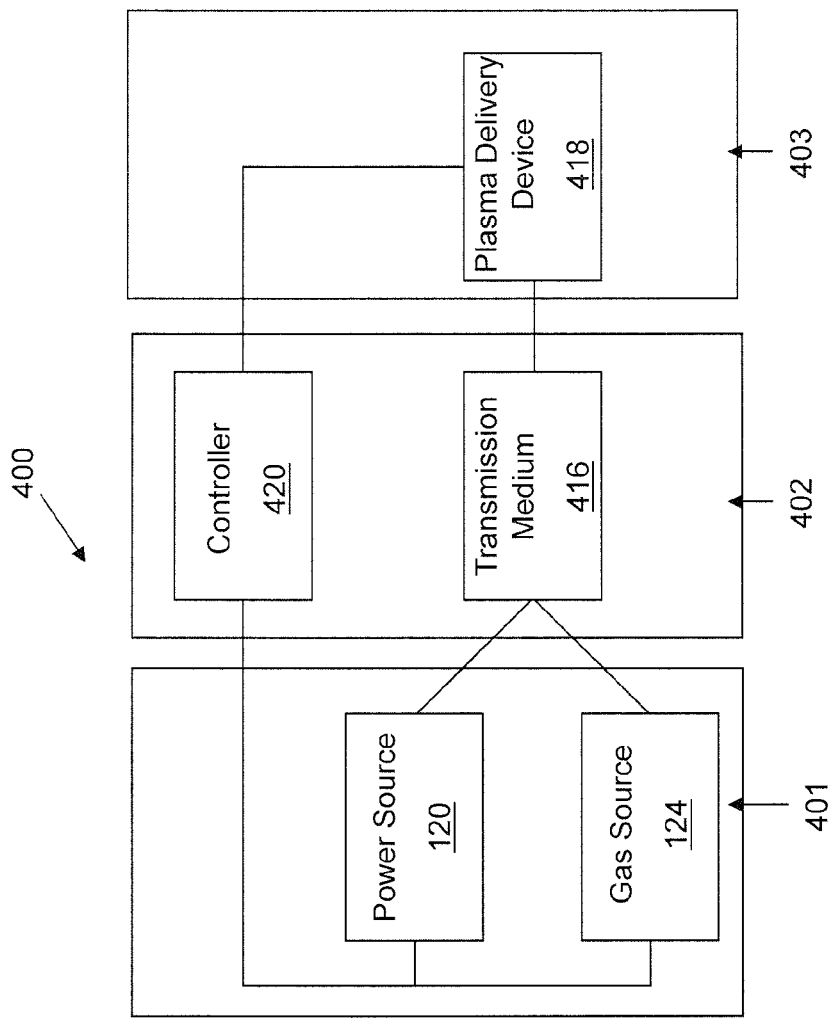
FIG. 5d is a variation of FIG. 5a with the plasma delivery device in one partition and connected to the control and transmission medium in a second partition, and connected to the power means and gas means, housed in a third partition.

FIG. 5d depicts a plasma torch system 400 that can be partitioned into an enclosure attachment section 401 (e.g., attachment module, or chargeable/rechargeable unit), an enclosure section 402 and a torch section 403. The enclosure section 402 includes a transmission medium 416 and a controller 420. The plasma delivery device 418 is located in the torch section 403. In one embodiment, the three sections are stored in a single, briefcase-style housing capable of being hand-carried by a user.

Figure 6:
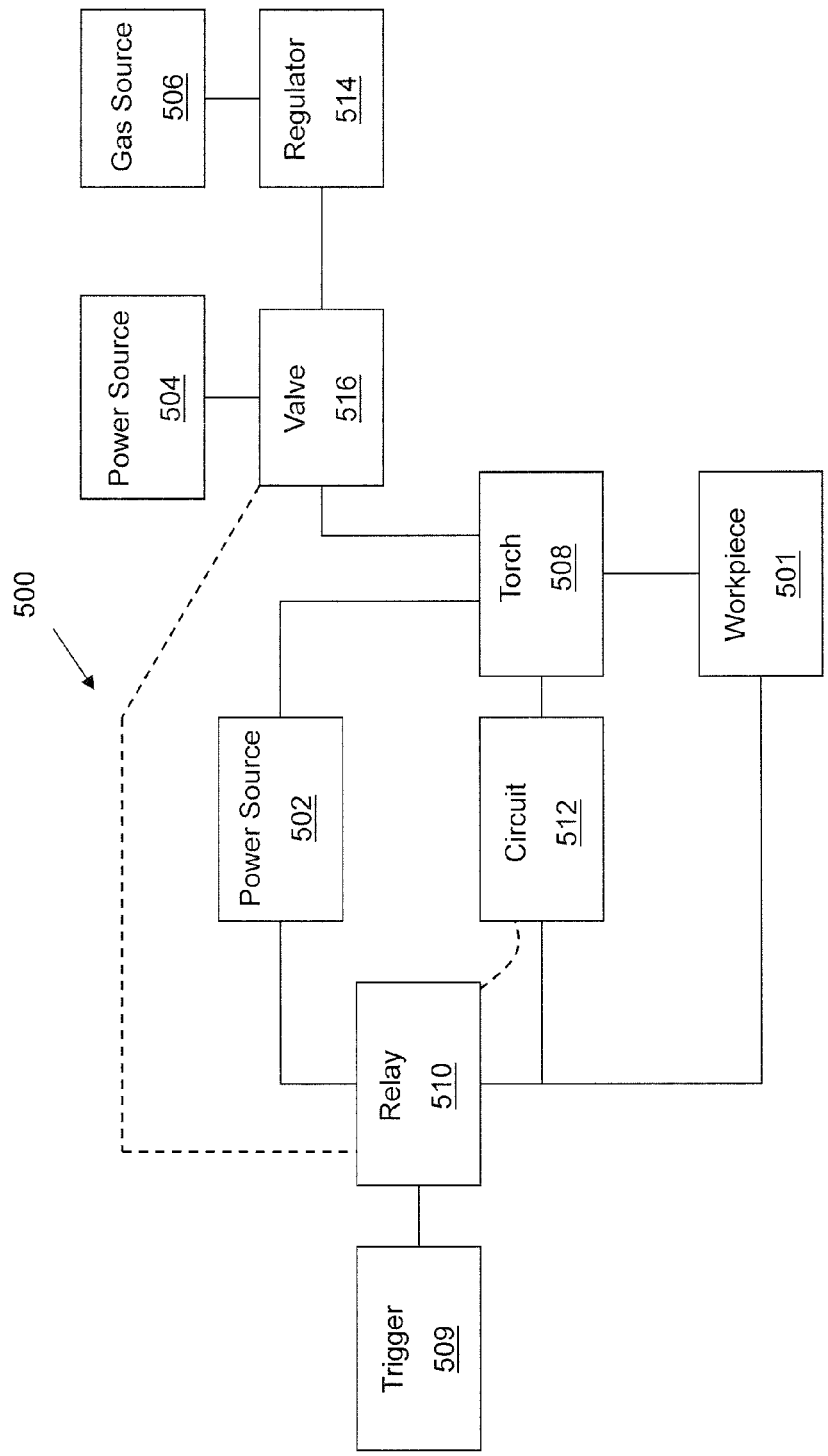
FIG. 6 is a detailed block diagram of an exemplary autonomous plasma arc torch system.

FIG. 6 is a detailed block diagram of an autonomous plasma arc torch system 500 capable of cutting a workpiece 501. The power system includes a pair of a rechargeable and/or replaceable power sources 502 and 504. In one detailed embodiment, the power source 502 is an acid lead battery with 12V, 1.3. Amps Hrs, maximum discharge current of 19.5 Amps, e.g. manufactured by IMC Power. In one detailed embodiment, the power source 502 is an Polymer Lithium Ion battery. In some embodiments, a boost converter and/or a buck converter can be used with the power source 608 to increase the voltage supplied to the torch. Embodiments can also use other known techniques, such as voltage stepping technologies, autotransformers, and various other circuits to increase the voltage supplied to the torch, causing it to be greater than the voltage output of the battery. The gas source 506 can be replaceable and/or rechargeable gas bottle. In one embodiment, the gas source 506 is a carbon fiber wrapped bottle with a 3,000 PSI capacity, e.g. manufactured by Pure Energy. An electrical lead set (not shown) provides a communication path between the power sources 502, 504 and the torch 508, and a fluid conduit (not shown) provides a fluid flow path between the gas source 506 and the torch 508.

The system includes a plasma arc torch 508, e.g., the PAC 105 hand torch manufactured by Hypertherm, Inc. The torch 508 can be turned on and off by manipulating the trigger 509. During operation, the torch 508 receives current and voltage from the power source 502 via a solid state relay 510. In one detailed embodiment, the relay 510 is a DC solid-state relay with output to 100 A, 200 VDC, e.g. manufactured by Teledyne Relay. A pilot arc circuit 512, powered by the power source 502, is provided to generate a pilot arc within the torch 508. The circuit 512 can be a custom-design or any one of a variety of pilot arc circuits known in the art of plasma torch technology.

The gas source 506 provides a supply of gas to the torch 508 via a pressure regulator 514 and a solenoid valve 516. In one detailed embodiment, a pressure reducing regulator is employed having 3,000 PSI input, 2-80 PSI output and 100 PSI max (e.g., manufactured by Premier Industries), and a two-way solenoid valve is used with a 24 VDC coil input, 6 Watts nominal operation range and a valve flow coefficient (Cv) of 0.155 (e.g., manufactured by GEMS Sensors and Controls).

To operate the system 500, the regulator 514 is adjusted to preset the pressure of the gas to be supplied to the torch 508 (e.g., to 60 psig). With the torch 508 being remotely located relative to the workpiece 501, a user pulls the trigger 509 to close the relay 510 and to activate the pilot arc circuit 512. The solenoid valve 516 is energized by the power source 504. The gas flow is established, and a pilot arc is initiated using the pilot arc circuit. At this point, the torch can be moved closer to the workpiece 501.

More specifically, with the relay 510 closed, the power source 504 supplies current and voltage to the pilot arc circuit 512, causing a pilot arc to form between the electrode and nozzle in the torch 508. Initiation of the gas flow via the valve 516 causes separation of the electrode and the nozzle, initiating an arc and igniting a plasma. With the plasma gas exiting the torch, the torch 508 is positioned in close proximity to the workpiece 501. The pilot arc and gas flow facilitate the formation of an electrical path between the workpiece 501 and the electrode. Eventually, a second arc forms between the electrode and workpiece. The pilot arc circuit 512 can be configured to provide a decreasing pilot arc current, so that the second arc remains as the pilot arc current goes to zero and pilot arc itself extinguishes. In one example, the torch 508 is capable of generating a transferred arc for about 30 seconds at 30 amps and 100 volts.

The elements as described in FIG. 6 can also be utilized to form a portable welding apparatus. The welding apparatus can include a power source, gas source, one or more controllers (similar to the controllers described in FIGS. 1-6 above) and transmission media (similar to the transmission media as described in FIGS. 1-6 above).

Figure 7A:
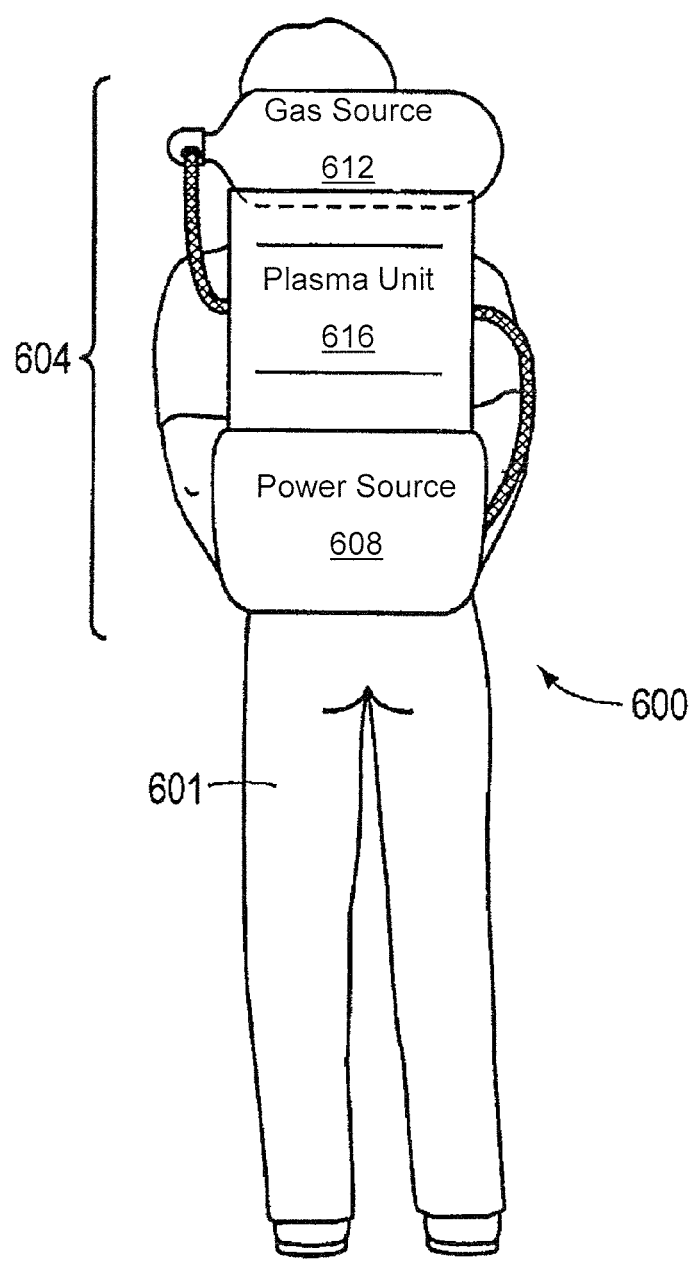
FIG. 7a is an illustration of a user with an exemplary wearable portable assembly of a plasma arc torch system.

FIG. 7a shows a user 601 with a wearable portable assembly 604. The plasma arc torch system 600 can include a wearable portable assembly 604 and a plasma delivery device (not shown). One or more rechargeable or replaceable power source(s) 608 and one or more rechargeable or replaceable gas source(s) 612 can be included in the wearable portable assembly 604. The power source 608 and gas source 612 can be removable. The power source 608 and gas source 612 can be similar to those as described above in FIGS. 1-6. In some embodiments, a plasma unit 616 can be included in the assembly 604. The plasma unit 616 can include one or more controllers 634 (similar to the controllers described in FIGS. 1-6 above) and a transmission medium 638 or transmission media (similar to the transmission media described in FIGS. 1-6 above). The power source 608 can include a plug outlet and the gas source 612 can include a "quick-connect" connector, allowing the user 601 to plug in the plasma unit 616 (such as a Powermax 30™ distributed by the Hypermax Corporation and manufactured by the Hypertherm) into the assembly 604.

The wearable portable assembly 604 can be a backpack, front-pack, and/or a shoulder strap mounted pack. In some embodiments, the wearable portable assembly 604 has a protective layer between the assembly 604 and the user 601 that is thermal resistant, electrically non-conductive, and/or impact resistant. The assembly 604 can be a breathable material to allow natural cooling of plasma unit 616 and power source 608. The assembly 604 can also include a central cooling chamber (not shown) that cools both the plasma unit 616 and the power source 608. The assembly 604 can be rigid, fireproof, and can include a bulletproof outer shell or frame. In some embodiments, the assembly 604 includes a consumable holder.

In some embodiments, the assembly 604 includes filament wound composite tanks. The power source 608, gas source 612, or plasma unit 616 can be enclosed by one or more composite tanks to reduce the weight of the assembly 604, increasing portability. A current regulator can be used in the power source 608 to increase portability of the assembly 604.

In some embodiments, the assembly 604 includes a power source 608 and a gas source 612 that stores power and gas. The assembly may not include a charging mechanism in order to increase portability of the assembly. In some embodiments, the power source 608 and gas source 612 of the assembly 604 can be recharged by plugging the assembly 604 into a wall. In some embodiments, the assembly 604 can be placed on or connected to a docking station (described further in FIG. 8 below) that recharges the power source 608 and/or gas source 612 while the assembly 604 is stored on the station. In some embodiments, the power source 608 and the gas source 612 can be enclosed/combined to form a detachable chargeable or rechargeable unit, such as an attachment module (e.g., attachment section 201) that can be used with the wearable plasma arc torch assembly. In some embodiments, instead of placing the assembly 604 on the docking station, only the attachment module/unit (comprising the power source 608 and gas source 612) can be placed on or connected to the docking station for charging.

In some embodiments, the assembly 604 includes a gas compressor that can be used as a gas source 612. The power source 608 can recharge the gas source 612 using a gas compressor. In some embodiments, pre-flow and post-flow steps are eliminated to preserve the power from the power source 608 and the gas from the gas source 612. Elimination of the pre-flow and post-flow steps can be applied to the embodiments as described in FIGS. 1-6 above to conserve power and gas.

In some embodiments, the plasma arc torch system 600 includes gas and power charge indicators that can be viewed by the user 601 without removing the assembly 604. The indicators can demonstrate a power remaining in the power source 608 or gas remaining in the gas source 612. In one embodiment, the indicators may be gauges located on the plasma delivery device. In another embodiment, the indicators may emit an audible signal to warn the user of low power and/or low gas. In some embodiments, the indicator includes a readout that indicates to a user when the power remaining in the power source has reached a minimal threshold level, when a gas remaining in the gas source has reached a threshold level, or an amount of cutting capacity remaining in the system 600. Alternatively, an indicator can be used to show a user how much operating time (e.g., cutting capacity) remains for the plasma arc torch apparatus, as the apparatus needs both power and gas to operate.

Figure 7B:
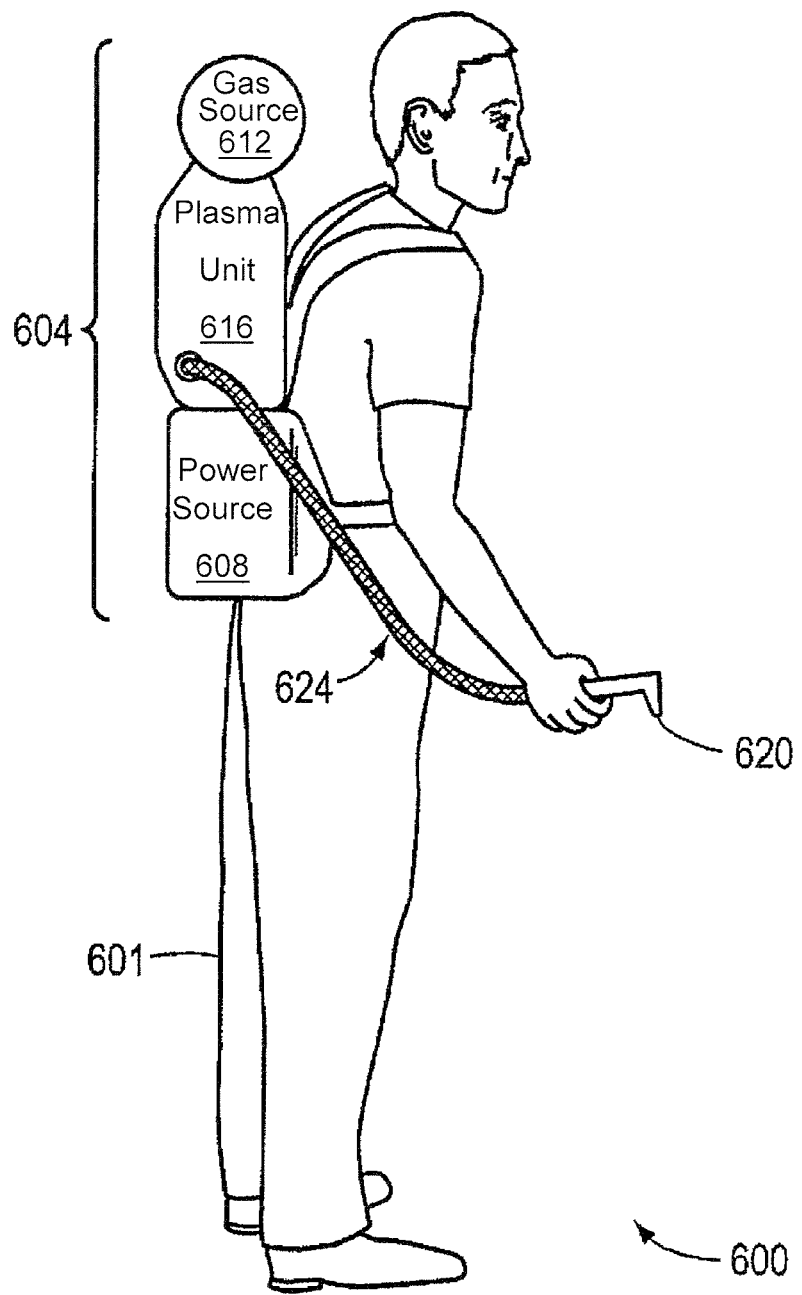
FIG. 7b is alternative view of the user with the exemplary wearable portable assembly and plasma delivery device of a plasma arc torch system.

FIG. 7b shows an alternative view of the user in FIG. 7a. The portable plasma arc torch system 600 includes a plasma delivery device 620 attached to the wearable assembly 604. In some embodiments, the plasma delivery device 620 includes a plasma torch that extends from the wearable portable assembly 604. The user 601 can wear the assembly 604 while operating the torch, allowing the user 601 to transport the plasma system 600. The assembly can also include a lead 624 to the plasma delivery device 620. In some embodiments, a reduced lead length to the plasma delivery device 620 can be formed to accommodate the arm length of a user 601 without having an excess lead.

The assembly 604 can be formed to have a low profile or can be formed to accommodate a helmet worn by the user 601. In some embodiments, the assembly 604 does not extend above a user's shoulders or includes a helmet cutout.

In some embodiments, the plasma torch system 600 includes a remote controller so that the user 601 can adjust the setting of the power source 608, plasma unit 616, and/or the gas source 612 without taking off the assembly 604. In some embodiments, the controls are mounted on the plasma delivery device 620.

The features of the wearable portable assembly 604 as described in FIGS. 7a-b, such as the power source 608, gas source 612, controllers 634, transmission media, materials used to form the assembly 604, gas and power indicators, and the structural design of the assembly 604 can be used for a portable welding apparatus.

Figure 8A:
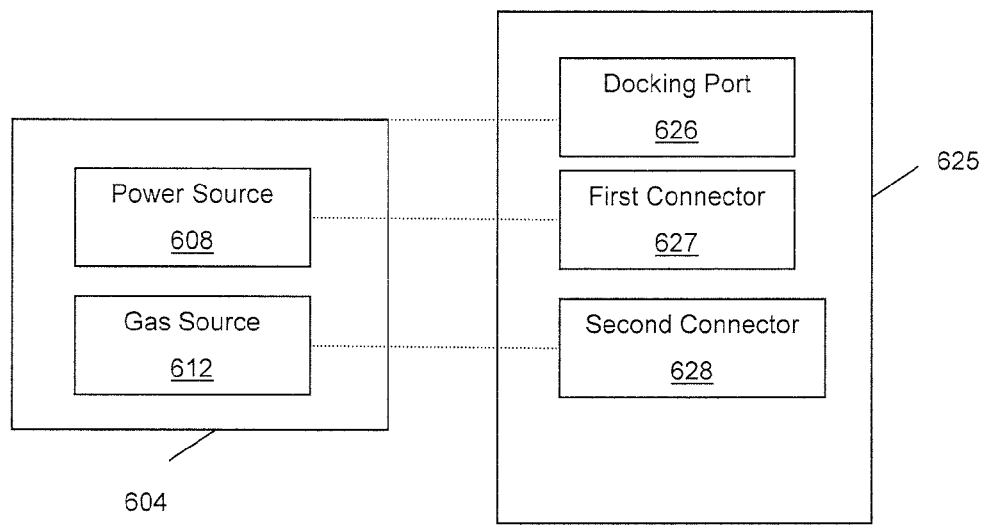
FIG. 8a is a block diagram of the components of a docking station for a wearable portable assembly, according to an illustrative embodiment.

FIG. 8a is a block diagram of the components of a docking station 625 for a wearable portable assembly 604, according to an illustrative embodiment. The docking station 625 includes a docking port 626 configured to receive the assembly 604 and a first connector 627 that electrically couples to the power source 608 when the assembly 604 is docked to the docking port 626 and provides power to recharge the power source 608. The docking station 625 also includes a second connector 628 that fluidly couples to the gas source 612 when the assembly 604 is docked to the docking port 626 and provides gas to recharge the gas source 612. In some embodiments, where the gas source 612 of the assembly 604 includes a compressor, the first connector 627 can be used to power the compressor to recharge the gas source 612.

In some embodiments, the wearable assembly 604 includes a detachable chargeable or rechargeable unit, such as an attachment module (e.g., attachment section 201) that includes the gas source 612 and power source 608. In some embodiments, instead of docking the assembly 604, the attachment module is docked to the docking station 625 (e.g., charging unit) to charge the power source 608 and/or gas source 612. The attachment module can be remotely connected/attached to the docking station 625 where the power source 608 can connected to the docking station 625 with wires and/or the gas source 612 can be connected to the docking station 625 with hoses. The attachment module can also be directly connected to the docking station 625 where the power source 608 is connected via a power connection 627 and the gas source 612 is connected via a gas connection 628. In some embodiments, after the gas source 612 and power source 608 is recharged, the attachment module is removed from the docking station and incorporated to the wearable assembly 604 for operation of the wearable assembly 604.

Figure 8B:
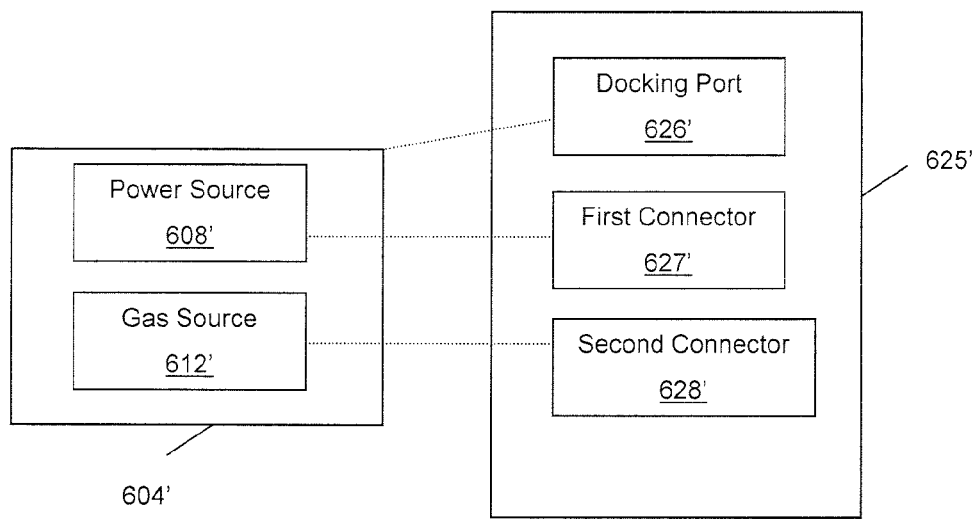
FIG. 8b is a block diagram of the components of a docking station for a portable plasma arc torch system, according to an illustrative embodiment.

FIG. 8b is a block diagram of the components of a docking station 625' for a portable plasma arc torch system 604' (similar to the exemplary embodiments described in FIGS. 1-6 above). The docking station 625' includes a port 626' configured to receive a portable plasma arc torch system 604'. The portable plasma arc torch system 604' has a power source 608' and a gas source 612' similar to the power sources and gas source described above in FIGS. 1-6. The docking station 625' includes a first connector 627' that electrically couples to the power source 608' when the system is docked to the docking port 626' and provides power to recharge the power source 608'. The docking station 625' also includes a second connector 628' that fluidly couples to the gas source 612' when the system is docked to the docking port 626' and provides gas to recharge the gas source 612'. In some embodiments, where the gas source 612' of the system includes a compressor, the first connector 627' can be used to power the compressor to recharge the gas source 612'.

In some embodiments, the portable plasma arc torch system 604' includes a detachable chargeable or rechargeable unit, such as an attachment module (e.g., attachment section 201) that includes the gas source 612' and power source 608'. In some embodiments, instead of docking the portable plasma arc torch system 604', the attachment module is docked to the docking station 625' (e.g., charging unit) to charge the power source 608' and/or gas source 612'. The attachment module can be remotely connected/attached to the docking station 625' where the power source 608' can connected to the docking station 625' with wires and/or the gas source 612' can be connected to the docking station 625' with hoses. The attachment module can also be directly connected to the docking station 625' where the power source 608' is connected via a power connection 627' and the gas source 612' is connected via a gas connection 628'. In some embodiments, after the gas source 612' and power source 608' is recharged, the attachment module is removed from the docking station and incorporated to the portable plasma arc torch system 604' for operation of the portable plasma arc torch system 604'.

Figure 8C:
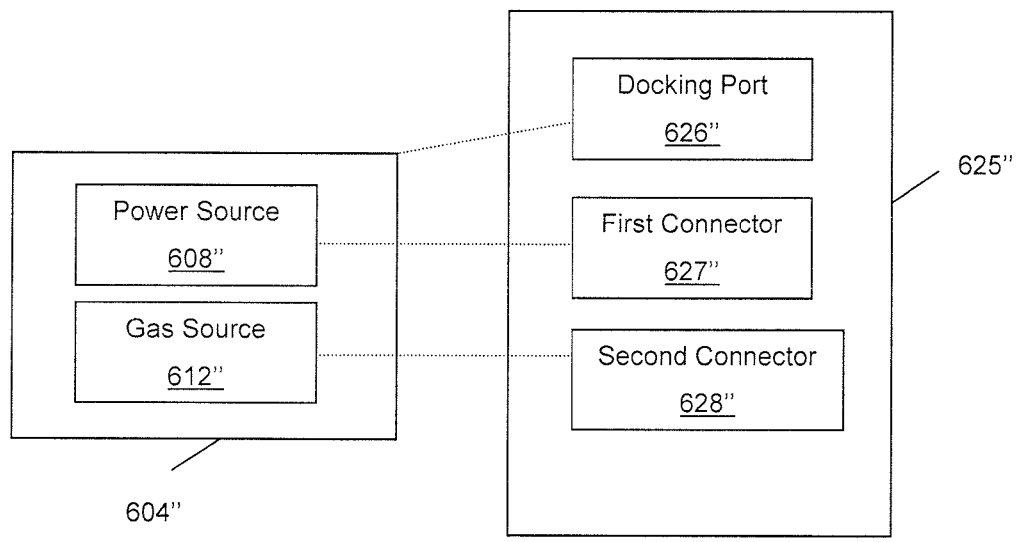
FIG. 8c is a block diagram of the components of a docking station for a portable welding apparatus, according to an illustrative embodiment.

FIG. 8c is a block diagram of the components of a docking station 625" for a portable welding apparatus 604". The docking station 625" includes a port 626" configured to receive the welding apparatus 604". The welding apparatus 604" also can include a power source 608" and/or a gas source 612". The docking station 625" includes a first connector 627" that electrically couples to the power source 608" when the system is docked to the docking port 626" and provides power to recharge the power source 608". The docking station 625" also includes a second connector 628" that fluidly couples to the gas source 612" when the system is docked to the docking port 626" and provides gas to recharge the gas source 612". In some embodiments, where the gas source 612" of the apparatus 604" includes a compressor, the first connector 627" can be used to power the compressor to recharge the gas source 612".

In some embodiments, the welding apparatus 604" includes a detachable chargeable or rechargeable unit, such as an attachment module (e.g., attachment section 201) that includes the gas source 612" and power source 608". In some embodiments, instead of docking the welding apparatus 604", the attachment module is docked to the docking station 625" (e.g., charging unit) to charge the power source 608" and/or gas source 612". The attachment module can be remotely connected/attached to the docking station 625" where the power source 608" can connected to the docking station 625" with wires and/or the gas source 612" can be connected to the docking station 625" with hoses. The attachment module can also be directly connected to the docking station 625" where the power source 608" is connected via a power connection 627" and the gas source 612" is connected via a gas connection 628". In some embodiments, after the gas source 612" and power source 608" is recharged, the attachment module is removed from the docking station and incorporated to the welding apparatus 604" for operation of the welding apparatus 604".

Figure 9:
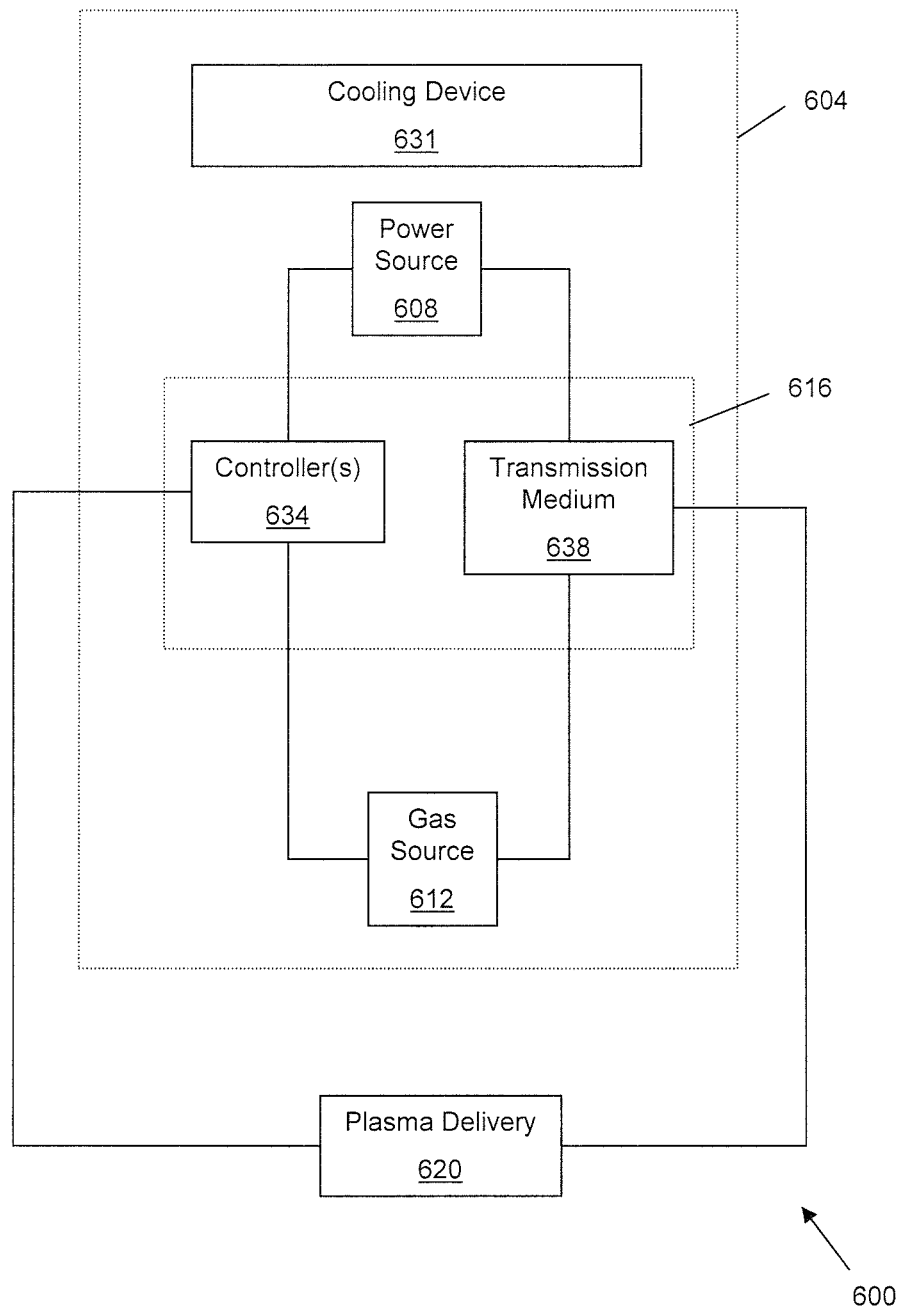
FIG. 9 is a block diagram of the components of an exemplary wearable portable assembly and plasma delivery device of a plasma arc torch system.

FIG. 9 is a block diagram of the components of the plasma arc torch system 600 including a wearable portable assembly 604. In addition to the power source 608, gas source 612 and plasma unit 616, the wearable assembly 604 can include a cooling device 631 that cools the plasma and the power source 608. In some embodiments, the cooling device 631 is a cooling chamber. In other embodiments, the cooling device 631 includes one or more cooling channels.

In some embodiments, the plasma unit 616 can include can include one or more controllers 634 (similar to the controllers described in FIGS. 1-6 above) and transmission medium 638 or transmission media (similar to the transmission media described in FIGS. 1-6 above). In some embodiments, the wearable portable plasma arc torch system 600 includes a control system with a pilot arc circuit 512, a solid state relay 510, pressure regulator 514, and/or solenoid valve 516 controlling the flow of current and/or gas as described above in FIG. 6.

Figure 10:
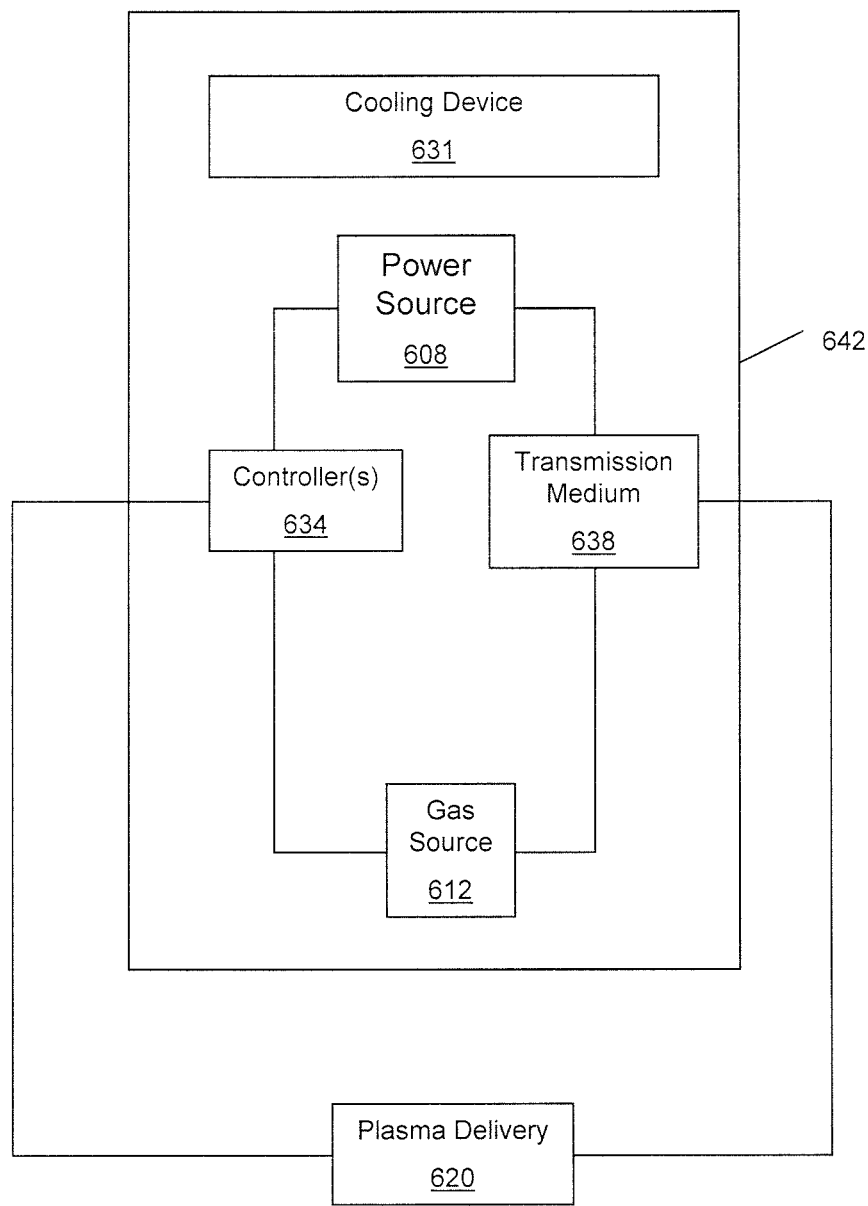
FIG. 10 is an example of a physical partitioning of the exemplary wearable portable assembly and plasma delivery device of the plasma arc torch system.

FIG. 10 is a block diagram of an exemplary physical partitioning of a wearable portable assembly 604. In some embodiments, the wearable assembly 604 is enclosed a housing 642. In some embodiments, the housing 642 is a flexible material and is configured to be a wearable assembly. In other embodiments, the housing 642 is disposed within the wearable assembly.

While FIG. 10 shows an example of the wearable assembly in a housing 642, other physical portioning arrangements can be used to enclose the assembly 604 or portions of the assembly. In some embodiments, one or more housing elements can be used to enclose the power source 608, gas source 612, plasma unit 616, or any combination thereof. In some embodiments, the housing is a flexible material and is configured to be a wearable assembly. In other embodiments, the housing is disposed within the wearable assembly.

Figure 11:
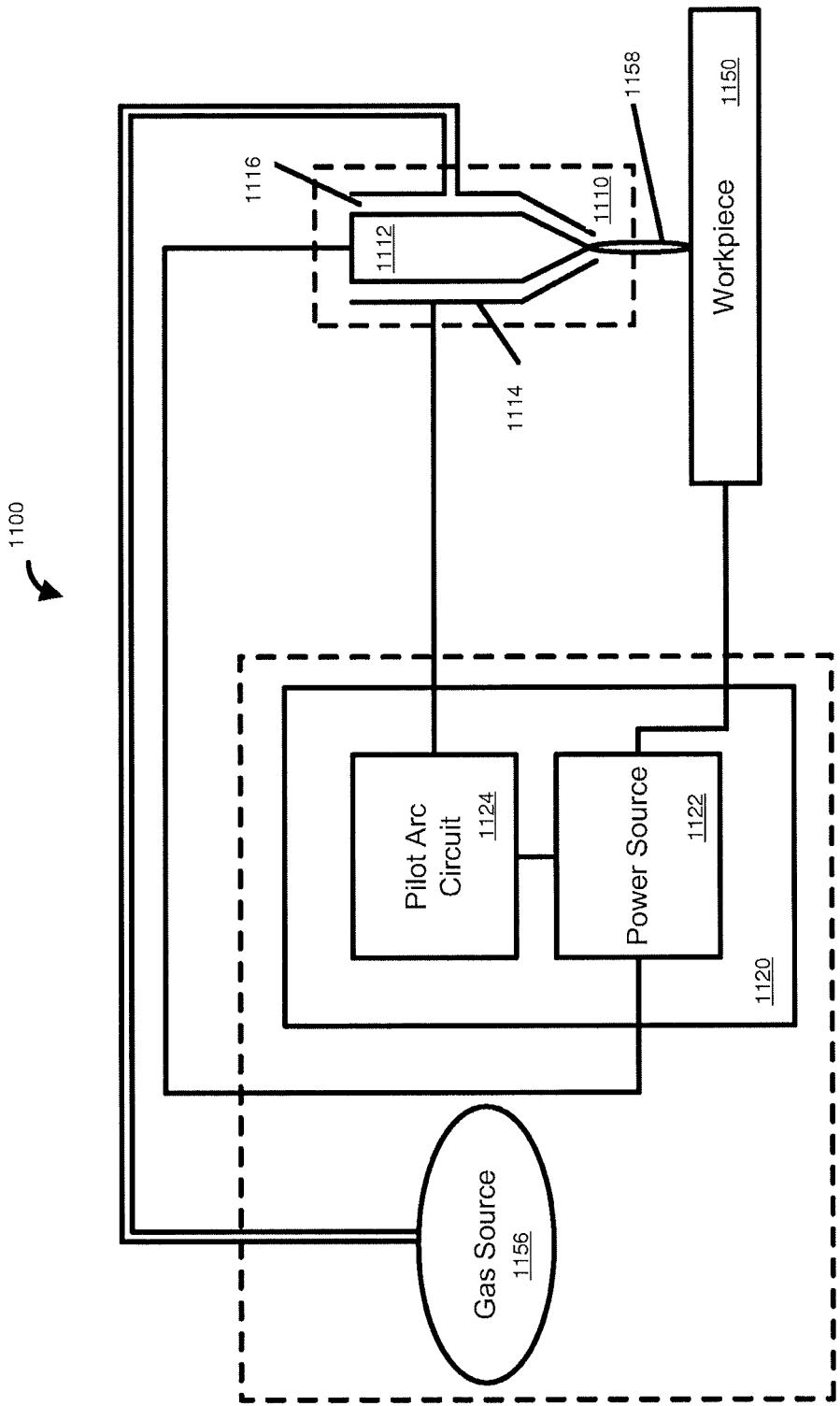
FIG. 11 is a block diagram of a contact start plasma arc torch, according to an illustrative embodiment.

In other embodiments, the power source 608, gas source 612, and plasma unit 616 are not enclosed in a housing, but are structurally connected to form the wearable assembly 604. FIG. 11 is a block diagram of a contact start plasma system 1100 including a power and gas source 1101 and a contact start torch body 1110. Generally, the contact start plasma system 1100 substantially eliminates the need for added circuitry to transfer between the pilot arc mode and the transferred arc mode. Typical added circuitry includes, but is not limited to, current sensing and logic control of the pilot arc circuit. The contact start plasma system 1100 eliminated this need by utilizing a passive pilot arc circuit 1124. The contact start plasma system 1100 includes a torch body 1110, a power supply 1120, and a gas source 1156. The torch body includes an electrode (cathode) 1112 and a nozzle (anode) 1114. The electrode 1112 and the nozzle 1114 are initially in contact with each other. The power supply 1120 includes a power source 1122 and a pilot arc starting circuit 1124.

To start the torch 1110, a low level electrical current is provided through the electrode 1112 and abutting nozzle 1114. Thereafter, a high pressure gas cylinder/source 1156 provides gas to the plasma chamber 1116. The gas has sufficient force to separate the electrode 1112 and the nozzle 1114. As the electrode 1112 and the nozzle 1114 separate, a pilot arc is created and the gas is ionized. The pilot arc is provided from the current flowing to the pilot arc starting circuit 1124 from the power source 1124 through the electrode 1112 and the nozzle 1114. As the separation distance increases, the ionized gas reduces the electrical resistance between the electrode and a workpiece 1150 creating a low resistance current path for the transfer arc 1158 between the electrode 1112 and the workpiece 1150. The transfer arc is provided from the current flowing from the power source 1122 to the workpiece 1150. At this point, the pilot arc is no longer needed and the current used to create the pilot arc can be switched to the transfer arc 1158. As mentioned above, prior art torches use current sensing devices and switches or like devices to effectuate this transfer, thereby adding to the cost and the size of the overall system. Whereas, the pilot arc starting circuit 1124 provides a seamless transfer of current through the use of a passive RC circuit. That is, as the capacitor in the RC circuit becomes more and more charged, the pilot current trends naturally toward zero and the pilot circuit behaves as if it were opened by a very high resistance value or a switch. Upon shutdown of the system 1100, the flow of gas to plasma chamber 1116 is terminated and the RC circuit is simultaneously dissipated, readying itself for the next starting sequence.

Figure 12:
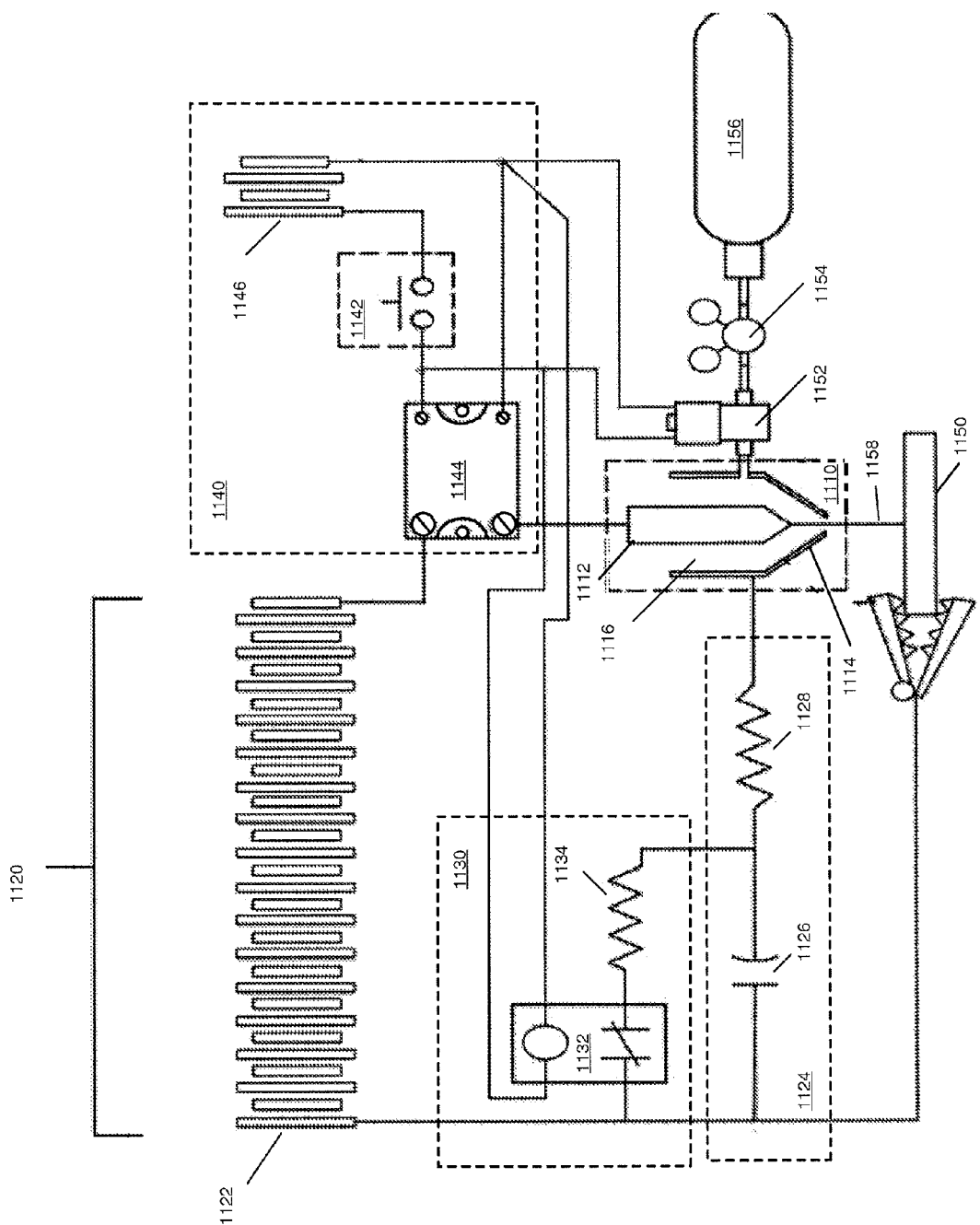
FIG. 12 is a detailed schematic diagram of the contact start plasma arc torch of FIG. 11.

FIG. 12 is a detailed schematic diagram of the contact start plasma system 1100. The plasma system 1100 includes a torch body 1110, a power supply 1120, and a gas source 1156.

The torch body 1110 includes an electrode 1112, a nozzle 1114, and an ignition circuit 1140. The electrode 1112 and the nozzle 1114 are initially in contact with each other. The electrode 1112 and a nozzle 1114 can be configured as a blow-forward type or a blow-back type wherein the electrode 1112 and the nozzle 1114 move or translate with respect to each other or any type known in the art. The ignition circuit 1140 includes a trigger 1142, an ignition relay 1144, and a power source 1146. In some embodiments, the power source 1146 can include a pair of twelve volt batteries connected in series; however any type of power source known in the art can be used.

The power supply 1120 includes a power source 1122, a pilot arc starting circuit 1124, and a pilot arc discharge circuit 1130. The power source 1122 can include conditioning electronics for operation with external power sources or an energy storage device (e.g., a battery). In some embodiments, the power source 1122 can include twelve to sixteen twelve volt batteries connected in series; however any type of power source known in the art can be used. The pilot arc starting circuit 1124 includes a pilot arc capacitor 1126 and a pilot arc resistor 1128 coupled in series to form a passive RC circuit. The value of the pilot arc capacitor 1126 can range between 10 microfarads and 100,000 microfarads. The value of the pilot arc resistor 1128 can range between 0.1 ohms and 100 ohms. In some embodiments, the pilot arc capacitor 1126 has a value of 18,000 microfarads and the pilot arc resistor 1128 has a value of 5 ohms. The pilot arc discharge circuit 1130 includes a pilot discharge relay 1132 and a pilot discharge resistor 1134. In some embodiments, the pilot discharge relay 1132 is a normally closed relay, but can any type of relay known in the art. The value of the pilot discharge resistor 1134 can range between 0.1 ohms and 100 ohms. In some embodiments, the pilot discharge resistor 1134 has a value of 5 ohms.

The gas source includes a gas solenoid 1152, a gas regulator 1154, and a gas cylinder 1155. The gas solenoid 1152 allows gas to flow into the plasma chamber 1116. The gas regulator 1154 controls the amount of gas pressure flowing into the plasma chamber 1116. The gas cylinder 1155 contains the type of gas to be used.

To start the torch 1110, the torch trigger 1142 is closed; thereby opening the pilot discharge relay 1132 and closing the ignition relay 1144. The closure results in voltage and current flowing from the power source 1122 through electrode 1112 to the nozzle 1114. Further, the resulting closure energizes a gas solenoid 1152 allowing gas to flow into the plasma chamber 1116. When the gas pressure in the plasma chamber 1116 has risen to a predetermined value either the electrode 1112 or the nozzle 1114 begins to move/translate. The gas pressure can be set by a gas regulator 1154. In some embodiments, the gas pressure is set to 60 psi. In some embodiments, high pressure air is contained in a high pressure gas cylinder 1155; however any type of reactive or non-reactive pressurized gas can be used. In some embodiments, the gas cylinder 1155 can be a fiber wound high pressure air cylinder. In some embodiments, the gas cylinder 1155 is charged to 4500 psi with a volume of 92 cubic inches.

Pilot/starting current also flows concurrently to the pilot arc capacitor 1126 through the pilot arc resistor 1128. The pilot arc capacitor 1126 charging current creates a pilot arc that ionizes the gas as the gas pressure in the plasma chamber 1116 separates the electrode 1112 and the nozzle 1114. The magnitude of the pilot arc capacitor 1126 charging current and the length of time the current will flow is determined by the RC time constant of the pilot arc circuit 1124. The pilot/starting current enables the pilot arc capacitor 1126 to begin to charge (i.e., store energy). In some embodiments, the pilot arc capacitor 1126 is partially charged before separation of the electrode 1112 and the nozzle 1114 and continues to charge as the pilot arc forms.

The pilot arc formed between the electrode 1112 and nozzle 1114 creates an ionized electrical path to the workpiece 1150 resulting in the flow of main cutting current (transfer arc) 1158 to the workpiece 1150. In some embodiments, the main cutting current (transfer arc) 1158 and voltage ramp up to their maximum operating values over several tens of milliseconds. The pilot current continues to charge the pilot arc capacitor 1126 at a continually decreasing rate until the capacitor 1126 becomes essentially fully charged. The amount of charge time required to fully charge the capacitor is determined only by the RC time constant. At this point, the pilot arc circuit 1124 naturally opens and the pilot current stops flowing through the pilot circuit 1124 and only the main cutting current (transfer arc) 1158 flows to the workpiece 1150. Thus, the passive pilot arc circuit 1124 provides a seamless/automatic/natural transfer of current to the workpiece 1150.

To turnoff the system 1103, the trigger 1142 is released opening the ignition relay 1144 and closing the discharge relay 1132 of the discharge circuit 1130. The closing of the discharge relay 1132 allows the pilot arc capacitor 1126 to discharge through the pilot discharge resistor 1134. The plasma system 1103 is now ready to be restarted. In some embodiments, such as plasma torches started manually via a hand operated trigger, the discharge relay 1132 can be replaced with a "double-pole double-throw" switch type trigger, wherein the circuit is discharged upon release of the trigger.

The magnitude of the current flow to the workpiece 1150 is determined by the current output capacity of the power source 1122 and the electrical characteristics of the transferred plasma arc. Some factors contributing to controlling the current output capacity of the torch, alone or in combination, include a) consumable design that determines operating plasma arc voltage and the resistive character of the plasma arc; b) overall cutting circuit electrical resistance; c) state of battery charge; and d) battery open circuit voltage. It should be understood by in skilled in the art that other factors may also be considered.

Figure 13:
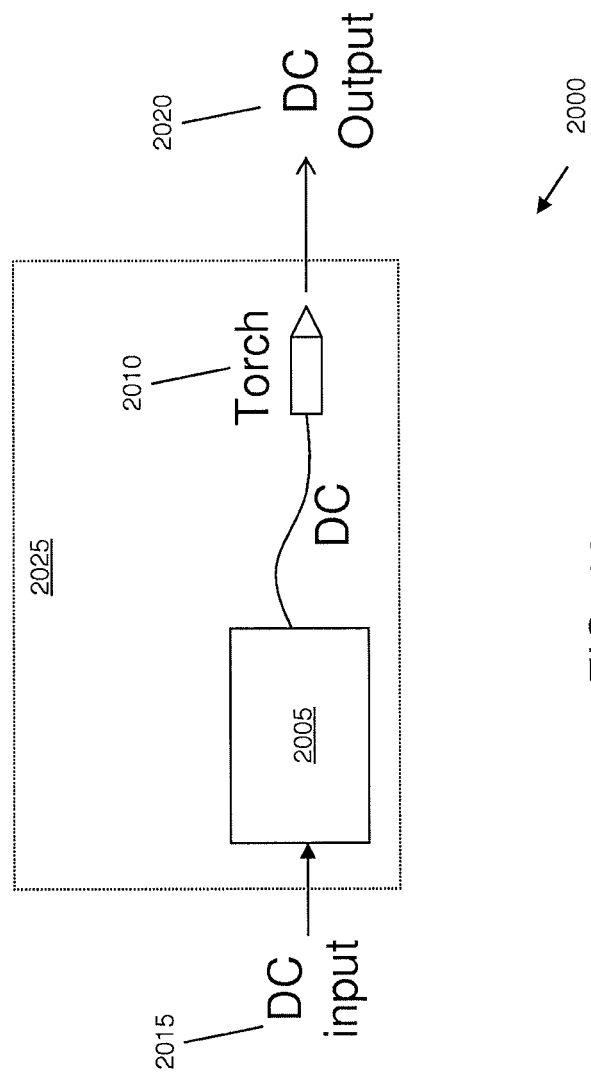
FIG. 13 is a schematic diagram of a plasma arc torch system, according to an illustrative embodiment.

FIG. 13 is a schematic of a plasma arc torch system 2000, according to an illustrative embodiment. The plasma arc torch system 2000 can include a control unit 2005 and a torch 2010 that uses DC power only. The input 2015 to the plasma system can be DC and all electrical energy used in or by the system, whether for control or operation, can be DC. The output of the system 2020 can also be DC. The control unit 2005 can include basic electrical and gas controls, such as on-off switches and solenoid valves. Preferably, absent from the control unit in this embodiment is any power conditioning circuitry (e.g., boost circuits, buck circuits, or voltage stepping circuitry), and no inverters or high-frequency (e.g., MOSFET or FET) switching is required.

In some embodiments, the plasma arc torch system 2000 is a self-contained portable plasma arc torch system. The self contained portable plasma arc torch system can include a housing (not shown), a plasma arc torch assembly comprising a plasma arc torch control unit 2005 and a plasma arc torch 2010, the plasma arc torch control unit 2005 disposed in the housing and connected to the torch. The plasma arc torch system 2000 can include a battery for providing DC power 2015 to the plasma arc torch assembly, the battery disposed relative to the housing and providing sufficient voltage to a torch electrode to enable torch operation without requiring power conditioning circuitry.

In some embodiments, the plasma arc torch system 2000 also includes a portable gas source (not shown) for providing a gas to the plasma arc torch assembly, the gas source supported by the housing (not shown). The portable gas source can be about a high-pressure gas container. In some embodiments, the self-contained portable plasma arc torch system is sufficiently portable to be entirely held or worn by a user during operation of the plasma arc torch. In some embodiments, the battery and a gas source are part of an attachment module (further described below), the attachment module being detachable from the system 2000. The attachment module can be connected to the plasma arc torch assembly with a power connection for the battery or a gas connection for the gas source. The attachment module can be connected to the plasma arc torch assembly with at least one of an electrical connection for transferring power with the battery or a hose connection for transferring gas.

In some embodiments, a voltage supplied by the battery to the plasma arc torch assembly is greater than the operating voltage (e.g., at least about 45 volts of DC power). The battery can provide sufficient voltage to a torch electrode without requiring power conditioning circuitry that includes (e.g., voltage step-up circuitry or high frequency switching).

The DC input voltage 2015 can have a minimal threshold voltage to minimize or eliminate the need for conditioning of the incoming power, or eliminate the need to use known boost or voltage stepping technologies to increase the voltage available for cutting. Embodiments accomplish this using polymer lithium battery technology. A plasma arc torch assembly 2025 (e.g., control unit 2005 and torch 2010) can have DC input 2015 supplied through batteries or other means that is as great as or greater than the minimum voltage threshold required to enable the plasma arc torch assembly 2025 to cut a workpiece. For example, in some embodiments, supplying the DC input 2015 at greater than 80 volts allows the plasma arc torch assembly 2025 to use the input energy 2015 without stepping up the voltage. This results in a simpler, lower weight, smaller plasma arc torch assembly (e.g., which can include a control unit 2005). Different voltage amounts (e.g., from a smaller or lower capacity battery, not shown) can also be used for other purposes, such as torch on-off control switching, gas solenoid actuation, or other functions that might benefit from use of different voltages.

In some embodiments, the power source (e.g., battery) that provides DC voltage 2015 to the plasma arc torch 2025 can include a module that includes a plurality of cells, the module having a storage capacity. The power source can be combined with a gas canister for a lightweight, self-contained portable (e.g., hand-held, carry-able (e.g., shoulder belt), wearable, or cart-able) plasma arc torch system. A self-contained system can have its own source of power or gas, or both. Table 1 below shows the different energy to weight configurations for a battery and gas canister (e.g., a chargeable or rechargeable unit), according to an illustrative embodiment.

TABLE 1

| Module Voltage (10 cells) | Power Source Voltage (4 modules in series) | Module Capacity | Energy (Watt-Hour) | Weight of Power Source and Gas Canister | Energy to Weight Ratio |
| --- | --- | --- | --- | --- | --- |
| 42 Volts | 168 Volts | 8 Ah | 1344 Wh | 72 lbs | 18.7 |
| 42 Volts | 168 Volts | 2.1 Ah | 353 Wh | 36 lbs | 9.8 |

A module can include, for example, 10 battery cells and can operate at 42 Volts. In some embodiments, four modules can be placed in series, resulting in a power source that provides 148 Volts to the plasma arc torch. In some embodiments, an individual module has a storage capacity of 8 Ah, which can provide approximately 15 minutes of cutting time. In other embodiments, an individual module has a storage capacity of 2.1 Ah, which weighs less, but can still provide approximately 4 minutes of cutting time.

A storage capacity of the individual module is related to the cutting time of the plasma torch 2025 and the weight of the power source and gas canister, which can be used in a lightweight, self-contained portable (e.g., hand-held, carry-able (e.g., shoulder belt), wearable, or cart-able) plasma arc torch system. A self-contained system can have its own source of power or gas, or both. A power source and gas canister that utilizes 8 Ah modules can weigh approximately 72 lbs, resulting in an 18.7 power to weight ratio. Similarly, a power source and gas canister that utilizes 2.1 Ah modules can weight approximately 26 lbs, resulting in a 9.8 power to weight ratio.

In some embodiments, the plasma arc torch system 2000 is a lightweight, portable plasma arc torch system. The system 2000 can include a plasma arc torch assembly comprising a plasma arc torch control unit and a plasma arc torch, a battery for providing DC power to the plasma arc torch assembly and a gas source for providing gas to the plasma arc torch assembly wherein a power to weight ratio for the lightweight portable plasma arc torch system is at least about 80 watts per pound.

In terms of gas storage capacity for a portable, e.g., handheld, carry-able (e.g., shoulder belt), wearable, or cart-able plasma torch system, an air storage SCBA vessel can be used. An example of such a container is the L17D tank available from Luxfer Gas Cylinders of Graham, N.C. (see http://www.luxfercylinders.com/products/lifesupport/specifications/us_imperial.shtml). Such a tank charged to 4500 psi can hold about 17 standard cubic feet of air, has an OD of 4.57 inches, an overall length of 11.7 inches, and an internal volume of about 110 cubic inches. Testing has shown that this amount of air is sufficient to support cutting at 30 amps for a duration of at least 3 to 4 minutes.

The gas storage capacity can be, in some embodiments, limited. For example, a portable plasma arc torch apparatus for generating a plasma arc for the high temperature thermal processing of materials can include a plasma delivery device including a plasma torch, a torch having an electrode and a nozzle defining a a plasma chamber therebetween. The apparatus can include a replaceable or rechargeable battery coupled to the plasma delivery device, the battery for providing cutting power to the plasma delivery device. The apparatus can also include a replaceable or rechargeable gas source having a finite supply of gas and coupled to the plasma delivery device to provide a gas to the plasma delivery device; wherein during a discharge of the gas source, substantially all of the gas is discharged through the plasma chamber.

In some embodiments, a flow of the gas is initiated at substantially the same time that the plasma arc is initiated. A flow of gas can be initiated at a time not more than about 10 seconds before initiation of the plasma arc. In some embodiments, a flow of the gas is substantially reduced or terminated at substantially the same time that the plasma arc is terminated. A flow of gas can be substantially reduced or terminated at a time not more than about 10 seconds after termination of the plasma arc.

A method for minimizing gas consumption of a portable plasma arc torch can include commencing a flow of gas to the portable plasma arc torch from a portable, finite supply of gas. The method can also include initiating a plasma arc, terminating the plasma arc, and sacrificing electrode life to minimize gas consumption by eliminating or substantially reducing a flow of the gas about an electrode of the plasma arc torch during preflow or postflow conditions, to less than approximately 10 seconds before commencement or after termination of the plasma arc, thereby minimizing gas consumption.

As an example, Applicants have developed a fully autonomous (i.e., self-contained power and gas supply) torch system that operates at 100 volts with an output of 30 amps, weighing not more than 37 pounds. This system has a power to weight ratio of 81 watts/pound of system weight and can provide several minutes of cutting operation on ¼" mild steel before recharging of the power and gas containers is necessary. Another system weighing 80 pounds can cut similar workpieces for up to 20 minutes. Yet a third prototype demonstrating the technology herein is able to cut at comparable voltages at 80 amps for 20 minutes. This system weighs 380 pounds, having a power to weight ratio of 21 watts/lb of system weight, but for a cut duration of 20 minutes. The system each included corresponding quantities of cutting gas to enable the system to operate as described above, which weight of the cutting gas and related enclosures is included in the data above.

In some embodiments, a plasma arc torch system includes indicators of a power remaining in the battery, a gas remaining in the source, an amount of cutting capacity remaining the system, or any combination thereof.

By way of example, a self-contained portable plasma arc torch system can include a housing, a plasma arc torch assembly, a battery for providing DC power to the plasma arc torch assembly, a gas source for providing a gas to the plasma arc torch assembly and an indicator representing at least one of a power level of the battery, a gas remaining in the gas source, or an amount of cutting capacity remaining in the system. The indicator can display an indicia when a gas level of a gas source has reached a threshold level or when an energy level of the battery source has reached a threshold level.

Figure 14A:
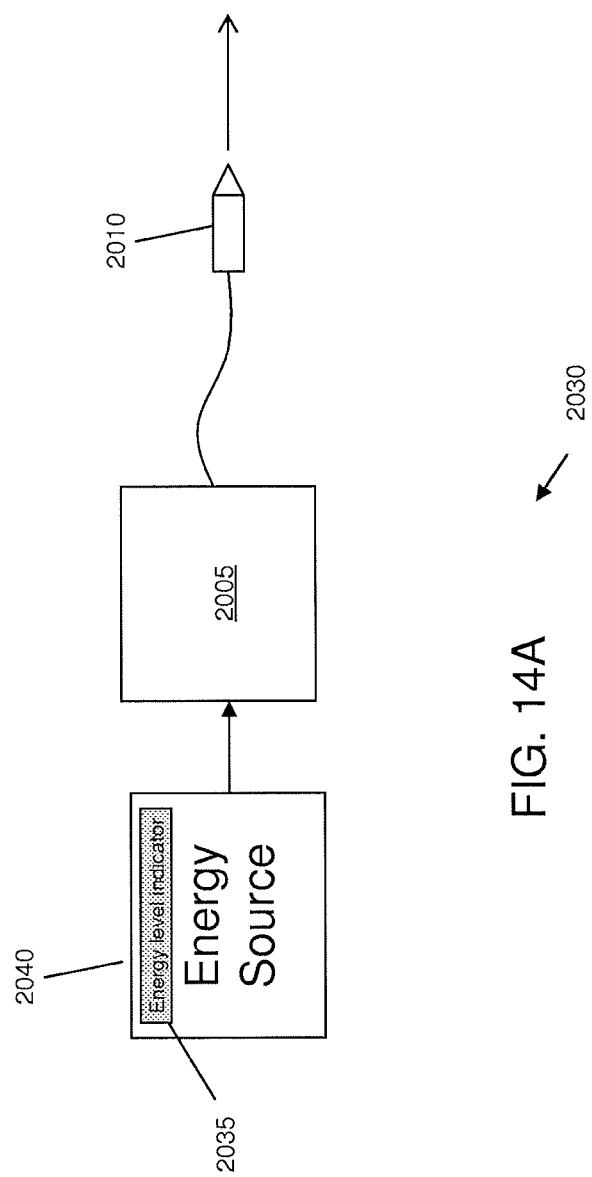
FIG. 14A is a schematic of a plasma arc torch system including an energy level indicator, according to an illustrative embodiment.
Figure 14B:
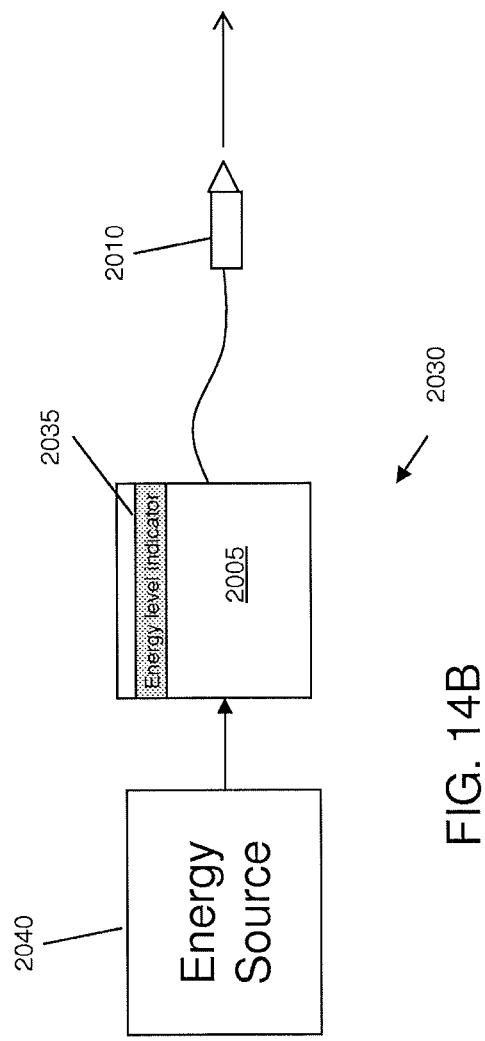
FIG. 14B is a schematic of a plasma arc torch system including an energy level indicator, according to another illustrative embodiment.
Figure 14C:
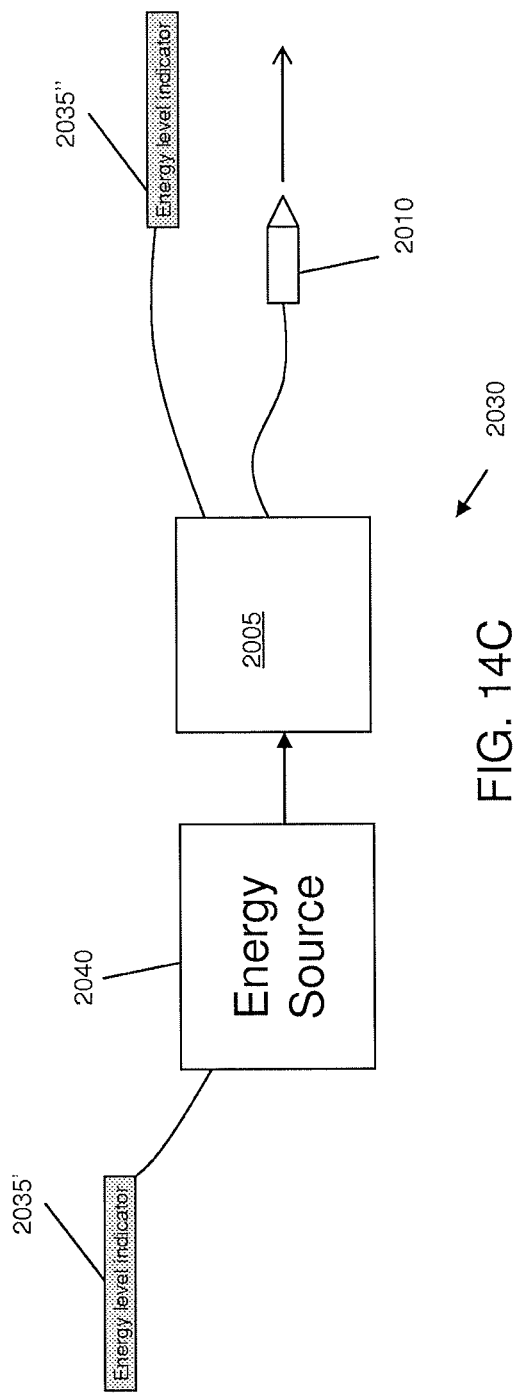
FIG. 14C is a schematic of a plasma arc torch system including an energy level indicator, according to yet another illustrative embodiment.

FIGS. 14A-C are a schematics of a plasma arc torch system 2030 including an energy level indicator 2035, according to different illustrative embodiments. The energy level indicator 2035 can tell the user if the battery 2040 has sufficient energy (e.g., power or voltage) to cut a workpiece (e.g., metal). The indicator 2035 can be a go/no-go, such as a green light/red light arrangement, or be a variable indicator showing different levels of energy (e.g., power or voltage) such as a gage or digital readout. The battery level indicator 2035 can be located in a number of locations such as on the battery 2040 itself, as shown on FIG. 14A, on the case of the battery, on the control panel of the plasma arc torch assembly 2025 (e.g, control unit) as shown in FIG. 14B, or on a tethered readout that can be placed in a location that is convenient for the user to see (e.g., much like a diver will use a remote gage to view a gage that shows the amount of air in the tanks that is mounted or attached or connected for easy viewing), as shown in FIG. 14C. An indicator 2035' can be disposed relative to the energy source 2040 (e.g., a tethered readout) or an indicator 2035" can be disposed relative to a control unit 2005 (e.g., a tethered readout). The energy level indicator 2035 can have many modes such as displaying the readout at all times or displaying the readout when the battery 2040 power reaches a threshold or displaying when prompted by the user. The energy level indicator 2035 can include an indicia when the power reaches a minimum threshold (e.g., power has been consumed close to a minimum threshold, which can correspond to the remaining operating or cutting time of the system), when the power source 2040 has been charged to a threshold, or any combination thereof.

Figure 15A:
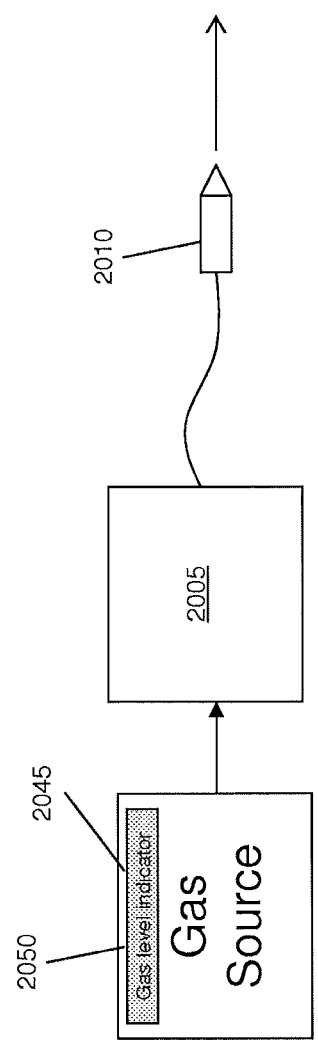
FIG. 15A is a schematic of a plasma arc torch system including a gas level indicator, according to an illustrative embodiment.
Figure 15B:
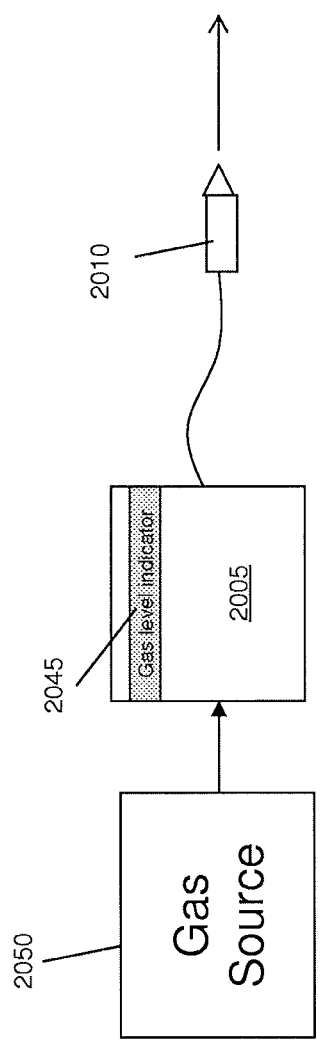
FIG. 15B is a schematic of a plasma arc torch system including a gas level indicator, according to another illustrative embodiment.
Figure 15C:
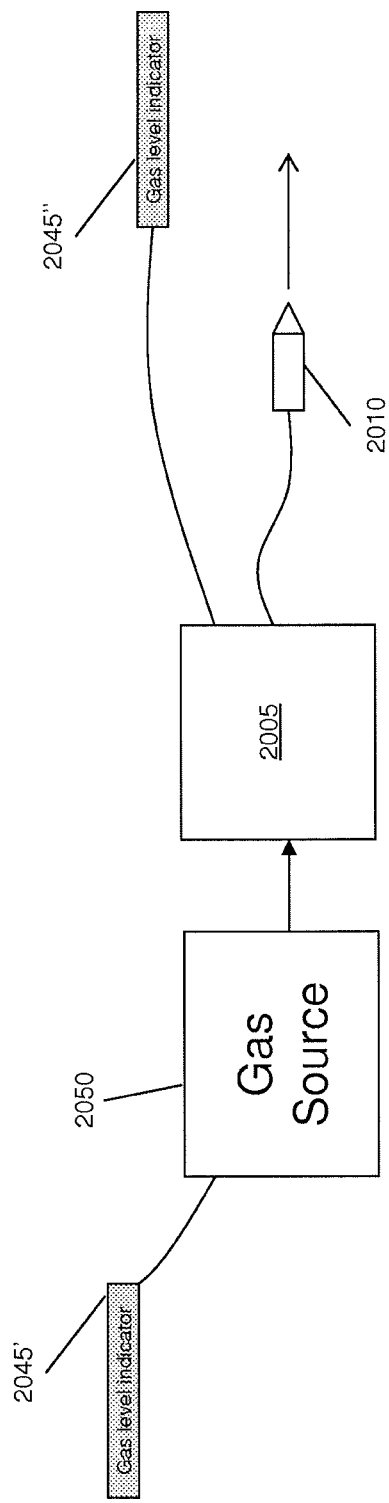
FIG. 15C is a schematic of a plasma arc torch system including a gas level indicator, according to yet another illustrative embodiment.

FIGS. 15A-C are schematics of a plasma arc torch system 2030 including a gas level indicator 2045, according to different illustrative embodiments. The gas level indicator 2045 can tell the user if the gas source 2050 has sufficient gas (e.g., pressure or flow) to cut a workpiece (e.g., metal). The indicator 2045 can be a go/no-go, such as a green light/red light arrangement, or can be a variable indicator showing different levels of gas (e.g., pressure of flow) such as a gage or digital readout. The gas level indicator 2045 can be located in a number of locations such as on the gas source 2050 itself; as shown in FIG. 15A, on the case of the gas source, on the control panel of the plasma arc torch assembly 2025 (e.g., control unit) as shown in FIG. 15B, or on a tethered readout. Indicator 2045' can be disposed relative to the gas source 2050 (e.g., tethered readout) or indicator 2045" can be disposed relative to the control unit 2005 (e.g., tethered readout)

that can be placed in a location that is convenient for the user to see (e.g., much like a diver will use a remote gage to view a gage that shows the amount of air in the tanks that is mounted or attached or connected for easy viewing) as shown in FIG. 15C. The gas level indicator 2045 can have many modes such as displaying the readout at all times or displaying the readout when the gas level of the gas source 2050 reaches a threshold or displaying when prompted by the user. The gas level indicator 2045 can include an indicia when the gas level reaches a minimum threshold (e.g., gas has been consumed close to a minimum threshold, which can correspond to the remaining operating or cutting time of the system), when the power source 2040 has been charged to a threshold, or any combination thereof.

Figure 16A:
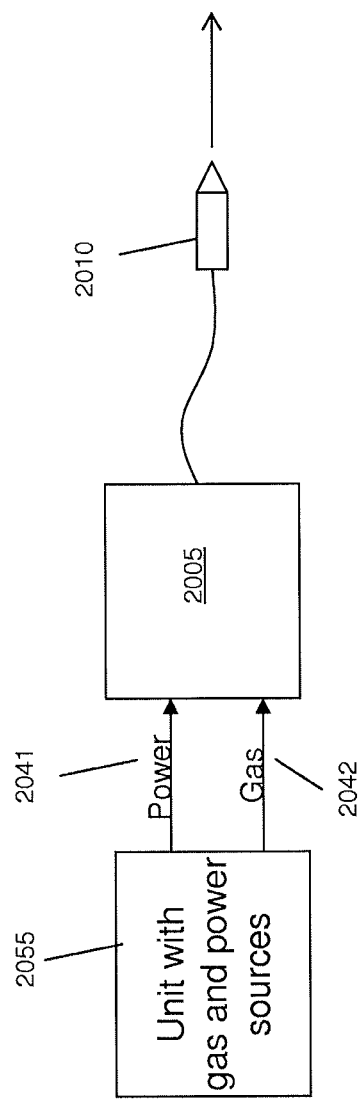
FIG. 16A is a schematic of an attachment module and a plasma arc torch assembly, according to an illustrative embodiment.

FIGS. 16A-B are schematics of an attachment module 2055 for a plasma arc torch assembly 2025, according to different illustrative embodiments. In some embodiments, a plasma arc torch assembly 2025 can include a plasma arc unit (e.g., a control unit 2005) with an attachment module 2055 (e.g., attachable or connectable unit) that houses/contains the plasma arc torch system's gas source 2050 and power source 2040. The attachment module 2055 (e.g., chargeable power and gas unit) can be remote from the plasma arc torch assembly 2025, as shown in FIG. 16A, connected by wires and hoses. The attachment module 2055 can be physically attached to the plasma arc torch assembly 2025, as shown in FIG. 16B, connected with wires and hoses or directly connected with gas connections and power connections. In some embodiments, the attachment module 2055 can be plugged into a wall and the plasma arc torch assembly 2025 can be connected to the attachment module 2055 during operation, avoiding use of the power source 2040 (e.g., battery) in the attachment module 2055.

In some embodiments, the plasma arc torch system 2000 is designed with a finite gas source 2050 that is designed for low gas consumption. The plasma arc torch assembly 2025 can be designed to minimize gas flow after arc is terminated, to minimize gas consumption. In some embodiments, the gas flow is stopped in less than 30 seconds after the arc is terminated and/or the gas flow is reduced in less than 30 seconds after the arc is terminated. Reducing gas consumption can be beneficial because the cutting duration of the system is increased, resulting in more cutting capability for a given size and weight. Reducing gas consumption can also be beneficial because the size of the finite gas supply can be reduced resulting in smaller, lighter, more portable plasma arc torch assembly 2025.

In some embodiments, the attachment module 2055 is a chargeable power and gas unit for a portable plasma arc torch system. The chargeable power and gas unit can include a portable housing (not shown), a source of cutting gas disposed relative to the portable housing (e.g., disposed either in the housing or attached to/supported by the housing) and a battery providing sufficient DC power for torch operation, the battery disposed relative to the portable housing (e.g., disposed in the housing). The chargeable power and gas unit can include a first connector assembly disposed relative to the portable housing, the first connector assembly comprising an input for receiving gas to charge the source of cutting gas (not shown) and a second connector assembly disposed relative to the portable housing, the second connector assembly (not shown) comprising an input for receiving a charge to charge the battery.

In some embodiments, the battery of the attachment module 2055 can provide sufficient DC power for torch operation without requiring power conditioning circuitry. The first connector assembly can include an output 2042' adapted to mate with a gas connection on a plasma arc torch system. The first connector assembly can include a hose 2042 to connect the chargeable power and gas unit with a plasma arc torch system. The second connector assembly can also include an output 2041' adapted to mate with a power connection on a plasma arc torch system. The second connector assembly can also include a wire 2041 to connect the chargeable power and gas unit with a plasma arc torch system.

In some embodiments, a plasma arc torch system can include a plasma arc torch that includes a power lead for receiving remote power from a non-portable power source, and a gas lead for receiving torch gas from a non-portable gas source. The system can also include a first connector assembly 2042 or 2042' for receiving a plasma gas from a plasma gas cutting source of an attachment module 2055 and a second connector assembly 2041 or 2041' for receiving DC electrical power from a DC battery of the attachment module 2055, such that the torch can be operated when the power lead and the gas lead are not connected, using only gas from the first connector 2042 or 2042' and power from the second connector 2041 or 2041'. In some embodiments, a battery of the attachment module 2055 provides sufficient voltage for torch operation without requiring power conditioning circuitry. Providing sufficient voltage for torch operation without requiring power conditioning circuitry can include providing voltage without stepping up the voltage or performing high frequency switching of the voltage. The battery of the attachment module 2055 can provide at least 80 Volts of DC power to the plasma arc torch.

In some embodiments, a self-contained portable plasma arc torch system includes a housing (not shown), a plasma arc torch assembly comprising a plasma arc torch control unit 2005 and a plasma arc torch 2010, the plasma arc torch control unit 2005 disposed in the housing and connected to the torch and a battery for providing DC power to the plasma arc torch assembly, the battery disposed relative to the housing and providing at least 80 Volts of DC power to a torch electrode.

In some embodiments, a portable plasma arc torch apparatus for processing materials includes a plasma delivery device (e.g., which can include a plasma arc torch 2010), a replaceable or rechargeable battery disposed relative to the plasma delivery device, the battery providing at least about 80 volts to the plasma delivery device and a replaceable or rechargeable gas source disposed relative to the plasma delivery device and providing a gas to the plasma delivery device for generation of a plasma arc.

Figure 17A:
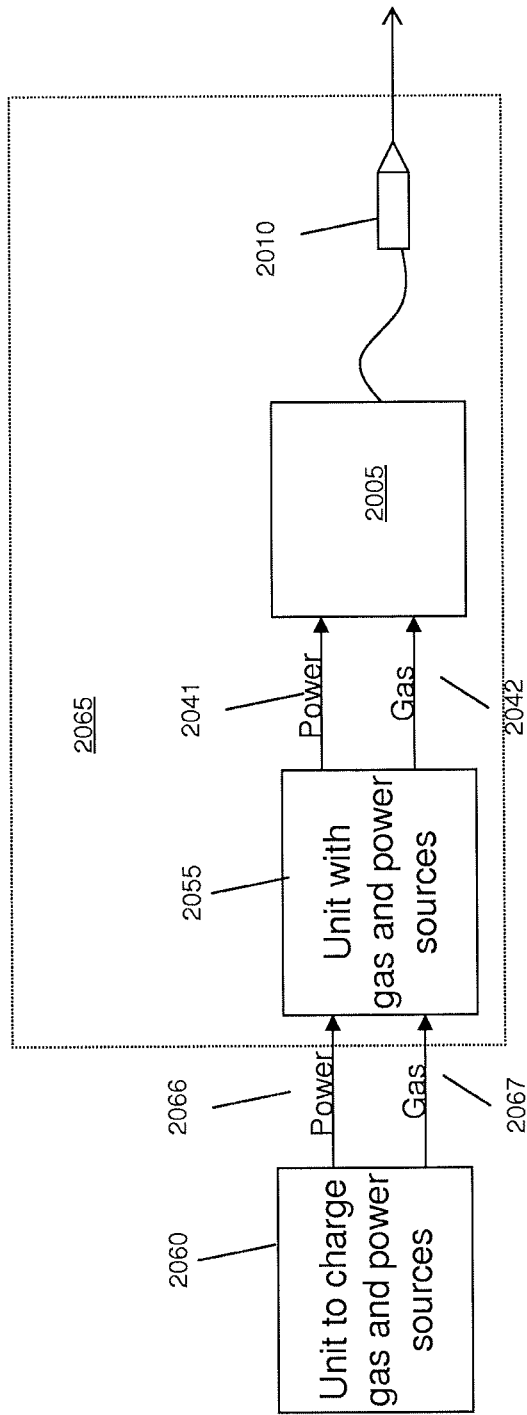
FIG. 17A is a schematic of a charging unit and the attachment module and plasma arc torch assembly of FIG. 16A.
Figure 17B:
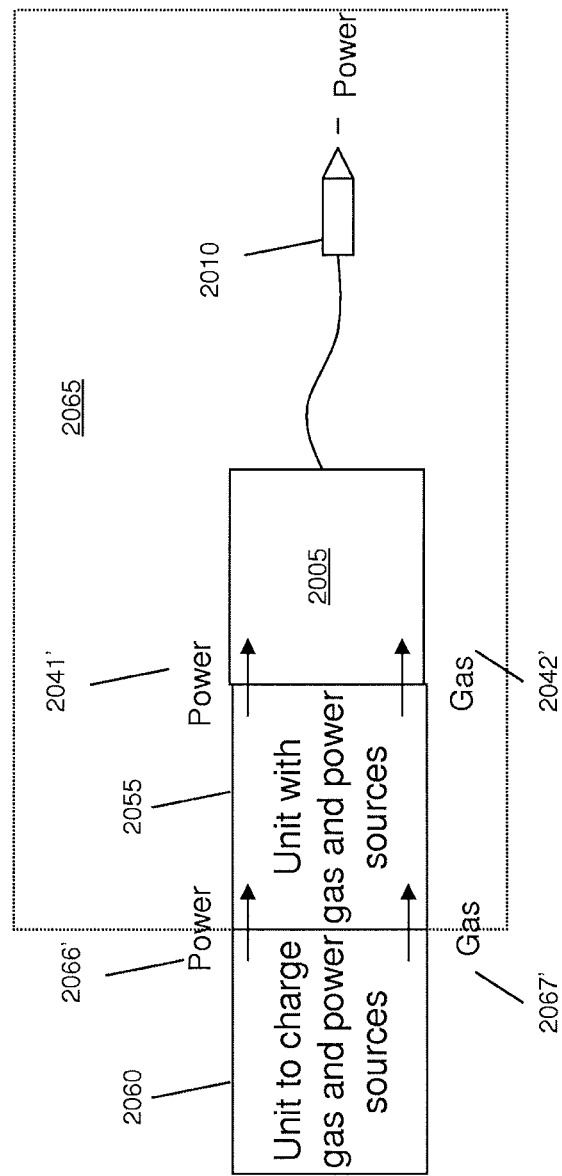
FIG. 17B is a schematic of a charging unit and the attachment module and plasma arc torch assembly of FIG. 16B.

FIGS. 17A-B are schematics of a charging unit 2060 for a gas source 2050 and/or a power source 2040 for a plasma arc torch assembly 2065, according to different illustrative embodiments. The plasma arc torch system 2000 can include a charging unit 2060 (e.g., connectable and/or attachable unit) that can charges gas source 2050 and/or power sources 2040 (e.g., gas source 2050 and power source 2040 of the attachment module 2055). The charging unit 2060 can be remote from the plasma arc torch assembly 2065, connected by wires and hoses, as shown in FIG. 17A. The charging unit 2060 can also be physically attached to the plasma arc torch assembly 2065 (e.g., control unit 2005 and torch 2010) connected with wires and hoses or directly connected with gas connections and power connections, as shown in FIG. 17B. The power 2040 and gas sources 2050 may be housed separately, either connected to the plasma arc torch assembly 2065 or remote to the plasma arc torch assembly 2065.

The charging unit 2060 can replenish a chargeable power and gas unit (e.g., such as an attachment module 2055 above) of a portable plasma arc torch system. The charging power and gas unit can include a connection to a plasma gas cutting source, a connection to an electrical power source for providing charging power, a first connector assembly (e.g., remote connection 2067 such as a wire or direct connection 2067' such as a power connection) for providing a gas charge to a gas source of the chargeable power and gas unit and a second connector assembly (e.g., remote connection 2066 such as a hose or direct connection 2066' such as a gas connection) for providing electrical power to charge the battery of the chargeable power and gas unit. The second connector assembly 2066 or 2066' can provide DC electrical power to the chargeable power and gas unit. In some embodiments, the first 2067 or 2067' and second connector 2066 or 2066' assemblies mate with corresponding connectors on the chargeable power and gas unit when the chargeable power and gas unit is mounted in the charging unit.

While the invention has been particularly shown and described with reference to specific embodiments, it should be understood by those skilled in the art that various changes in form and detail may be made therein without departing from the spirit and scope of the above description.

What is claimed is:

1. A handheld portable plasma arc torch system comprising:
    a replaceable or rechargeable power source comprising a battery that provides DC power to the plasma arc torch system to enable torch operation;
    a replaceable or rechargeable gas source;
    a plasma delivery device for receiving current from the power source and gas from the gas source to generate a plasma arc;
    an enclosure for confining the gas source, the power source and the plasma delivery device in or on a frame, wherein the enclosure, including the gas source, the power source and the plasma delivery device, has a weight and a power-to-weight ratio of at least about 80 watts per pound; and
    a handle attached to the enclosure for enabling an operator to carry the enclosure during a plasma cutting operation.

2. The handheld portable plasma arc torch system of claim 1, wherein the battery provides DC power to the plasma arc torch assembly to enable torch operation without requiring power conditioning circuitry.

3. The handheld portable plasma arc torch system of claim 1, wherein the system is configured to perform plasma cutting operation without a continuous gas source.

4. The handheld portable plasma arc torch system of claim 1, further comprising a control unit disposed in the enclosure, wherein the control unit is adapted to communicate with at least one of the power source or the gas source.

5. The handheld portable plasma arc torch system of claim 4, wherein the control unit includes (i) an on-off electrical switch and (ii) gas controls for providing a gas to the plasma arc torch.

6. The handheld portable plasma arc torch system of claim 1, wherein the gas source is a high-pressure gas container.

7. The handheld portable plasma arc torch system of claim 1, wherein the power source supplies a voltage of at least about 45 volts to the plasma delivery device.

8. The handheld portable plasma arc torch system of claim 1, wherein the system is configured to perform plasma cutting operation unconnected to an electric power grid.

9. The portable plasma arc torch system of claim 1, wherein the gas source comprises a compressor adapted to compress the gas for delivery to the plasma arc torch.

10. The portable plasma arc torch system of claim 9, wherein the power source powers the compressor to recharge the gas source.

11. A handheld portable plasma arc torch system comprising:
    a housing for enclosing therein i) a plasma delivery device comprising a plasma arc torch; (ii) a battery configured to provide DC power to the plasma delivery device without requiring power conditioning circuitry, and (iii) a gas source for providing a gas to the plasma delivery device, wherein the housing, including the plasma delivery device, the battery and the gas source, has a weight and a power-to-weight ratio of at least about 80 watts per pound; and
    a handle associated with the plasma arc torch and enabling the housing to be hand carried.

12. The portable plasma arc torch system of claim 11, further comprising a control unit disposed in or on the housing and connected to the plasma delivery device.

13. The portable plasma arc torch system of claim 11, wherein the battery provides sufficient voltage to a torch electrode without requiring power conditioning circuitry that includes voltage step-up circuitry or high frequency switching.

14. The portable plasma arc torch system of claim 11, wherein the battery is configured to provide at least 80 volts of DC output voltage to a torch electrode without requiring power conditioning circuitry.

15. The portable plasma arc torch system of claim 11, further comprising a passive pilot arc circuit coupled between the battery and the plasma delivery device in the housing, the pilot arc circuit controlling operation of the torch system in a pilot arc mode.

16. The portable plasma arc torch system of claim 15, wherein the pilot arc circuit includes a pilot capacitor and a pilot resistor.

17. The portable plasma arc torch system of claim 11, wherein a flow of the gas is initiated at substantially the same time that a plasma arc is initiated.

18. The portable plasma arc torch system of claim 11, wherein a flow of the gas is initiated at a time not more than about 10 seconds before initiation of a plasma arc.

19. The portable plasma arc torch system of claim 11, wherein a flow of the gas is substantially reduced or terminated at substantially the same time that a plasma arc is terminated.

* * * * *